United States Patent [19]
Matoba et al.

[11] Patent Number: 5,720,253
[45] Date of Patent: Feb. 24, 1998

[54] DIRECT-INJECTION TYPE SPARK-IGNITION INTERNAL COMBUSTION ENGINE

[75] Inventors: Tadashi Matoba, Yokosuka; Teruyuki Itoh, Tokyo; Akihiro Iiyama, Zushi; Akihiko Kakuhou, Yokohama, all of Japan

[73] Assignee: Nissan Motor Co., Ltd., Kanagawa, Japan

[21] Appl. No.: 716,850

[22] Filed: Sep. 10, 1996

[30] Foreign Application Priority Data

Sep. 11, 1995 [JP] Japan .................. 7-232133
Sep. 11, 1995 [JP] Japan .................. 7-232134
Sep. 11, 1995 [JP] Japan .................. 7-232135

[51] Int. Cl.⁶ .................................. F02B 23/10
[52] U.S. Cl. .................. 123/298; 123/301; 123/305
[58] Field of Search ......................... 123/298, 301, 123/305, 276

[56] References Cited

U.S. PATENT DOCUMENTS 5,127,379  7/1992  Kobayashi et al. .............. 123/305

FOREIGN PATENT DOCUMENTS 5-240047  9/1993  Japan .
6-81651   3/1994  Japan .
6-81655   3/1994  Japan .
6-207542  7/1994  Japan .

*Primary Examiner*—Andrew M. Dolinar
*Attorney, Agent, or Firm*—Lowe, Price, LeBlanc & Becker

[57] ABSTRACT

A direct-injection type spark-ignition internal combustion engine comprises a fuel-injection valve whose spray hole is inclined toward a piston crown, while an uppermost line of fuel spray injected through the spray hole is set at a lower level than electrodes of the spark plug and a lowermost line of the fuel spray is in spaced relationship with a cylinder inner wall close to the spray hole. The piston crown is formed with a recessed portion and a raised flat-surface portion to define a ridge line as an intersecting line between them. The ridge line is offset from a center axis of the cylinder by a predetermined distance toward the exhaust-valve port side. Preferably, a spray angle between the uppermost and lowermost lines is set within a predetermined angle range of $70° \pm 20°$.

15 Claims, 18 Drawing Sheets

DIRECT-INJECTION TYPE SPARK-IGNITION INTERNAL COMBUSTION ENGINE

BACKGROUND OF THE INVENTION

1. Field of the Invention

The present invention relates to a cylinder direct-injection type spark-ignition internal combustion engine in which fuel is directly injected into engine cylinders and it is ignited by an electric spark, and specifically to techniques for optimally combusting fuel directly injected into combustion chambers while suppressing dilution of engine lubricating oil with fuel, minimizing exhaust smoke, and preventing misfiring in the spark plug.

2. Description of the Prior Art

In recent years, there have been proposed and developed various direct-injection spark-ignition internal combustion engines. One such direct-injection spark-ignition engine has been disclosed in Japanese Patent Provisional Publication No. 5-240047 or in Japanese Patent Provisional Publication No. 6-81651. As seen in FIG. 23, the prior art cylinder injection type internal combustion engine disclosed in the Japanese Patent Provisional Publications Nos. 5-240047 or 6-81651 includes intake ports 5 formed in the engine cylinder head 2 and in the right-hand side (viewing FIG. 23) of a plane (denoted by FC) involving a center axial line of an engine cylinder (or a cylinder block) 12, a concave portion 203 formed on the piston head of the piston 202, offsetting from the center axial line of the engine cylinder toward the right-hand side of the plane FC and downwardly curved from the orthogonal line (denoted by LH) perpendicular to the center axial line of the engine cylinder, a gently raised portion 204 formed on the piston head of the piston 202, extending from the leftmost end of the concave portion 203 toward the left-hand side of the plane FC and approaching close to the inner wall surface 3a of the combustion chamber 3 with the piston positioned at the top dead center (TDC), and a fuel-injection valve 4 provided for directly injecting or spraying the fuel into the combustion chamber 3 and particularly towards the concave portion 203. In cooperation with the inlet ports 5, the concave portion 203 acts to produce and promote vortex flow of intake air induced into the combustion chamber. Since the vortex flow TF, turning in the clockwise direction in FIG. 23, is produced in the longitudinal direction of the engine cylinder, the vortex flow TF will be hereinafter referred to as a "longitudinal intake-air vortex flow". In FIG. 23, by virtue of the curved concave portion 203, the vortex flow TF of intake-air is produced in such a manner as to turn or rotate about the parallel line LH1 parallel to the orthogonal line LH. Hitherto, fuel-spray characteristics such as a fuel-spray angle and the position of the ridge line defined between the curved concave portion 203 and the raised portion 104 were not sufficiently taken into account. Thus, assuming that the fuel-spray angle is designed to be greater than a particular angle which is determined depending on dimensions and geometry of the combustion chamber, there is an increased tendency for the incoming fuel to adhere to the combustion-chamber wall 3a irrespective of the shape of the piston 102, thus deteriorating exhaust-emission control performance by the increased amount of exhaust emissions such as smoke and particulates and by formation of unburned hydrocarbons (HC). Additionally owing to the unsatisfactory position of the ridge-line defined between the concave portion 203 and the raised portion 204, and owing to the longitudinal intake-air vortex flow serving as a tail wind with respect to the sprayed fuel flow, there is a possibility of easy adhesion of the sprayed fuel to the spark plug without proper vaporization, that is, the plug tends to get wet through the unvaporized fuel and to become sooty, thus causing carbon deposits or soot adhered to the plug, engine misfire, and adhesion of fuel onto the combustion-chamber wall. The fuel adhesion to the plug and the fuel adhesion to the combustion-chamber wall may result in undesirable smoke in the exhaust gases during the injection period in the vicinity of the top dead center (TDC) and also during the injection period on the intake stroke within a high-speed and high-load operating region. As a consequence, the undesired fuel adhesion lowers the combustion stability and the exhaust-emission control performance.

FIG. 22 shows another cylinder direct-injection type internal combustion engine disclosed in Japanese Patent Provisional Publication No. 6-81655. The engine disclosed in the Japanese Patent Provisional Publication No. 6-81655 includes a fuel-injection valve 101 provided in the perimeter of the internal wall of the cylinder head for injecting or spraying fuel toward the piston head of the piston 102. Also provided is a downwardly curved concave portion 103 similar to the concave portion 203 shown in FIG. 23. The fuel is injected to collide with the concave portion 103, for the purpose of suppressing formation of unburnt hydrocarbons (ITC). In the prior art engine shown in FIG. 22, a spray angle of fuel injected by the injection valve 101 is narrow or less. Owing to such a less fuel-spray angle, the momentum of the sprayed fuel tends to be concentrated spatially, thus producing an undesiredly increased spray penetration. Due to the excessively increased spray penetration, the fuel, which collides with the piston head and is reflected therefrom, may collide secondarily with the cylinder-head inner wall (i.e., the combustion-chamber wall), thereby resulting in undesired deposits in the engine.

FIG. 24 shows another cylinder direct-injection type engine disclosed in Japanese Patent Provisional Publication No. 6-207542. The Japanese Patent Provisional Publication No. 6-207542 teaches the provision of a stratified-charge spark-ignition engine. As is generally known, with stratified charging, a much leaner air-fuel mixture, on the average, can be used, for the purpose of greatly reducing fuel-economy loss. As seen in FIG. 24, a fuel-injection valve 101 is installed in the engine cylinder head and in the vicinity of the intake valve port 5 The spray hole of the fuel-injection valve 101 is directed to a dish-shaped concave portion 105a formed on the piston head of the piston 105, so that the fuel injected or sprayed from the spray hole collides with the concave portion 105a and is reflected therefrom, and that the sprayed fuel reflected from the concave piston-head portion 105a is directed to the spark plug 1 and thus the richest air-fuel mixture is concentrated around the spark plug 1. That is, during the compression stroke, the rich mixture is concentrated around the plug and the concentration of the rich mixture is first ignited during the combustion stroke. Generally, such stratified charging is effective under a low engine-load operating condition in which the amount of fuel-injection is comparatively less. In contrast to the above, during high engine-load operation wherein the amount of fuel injected is comparatively great due to demands of more engine power (or output torque), there is less requirement for stratified charging, and in lieu of this it is necessary to form more uniform air-fuel mixture layers, particularly in order to avoid the engine from knocking. Alternatively, during the high engine-load operation on the intake stroke in which the intake valve 16 is opened, it is necessary to inject fuel without stratified charging. However, fuel-spray characteristics of the prior art engine is insufficient to provide more uniform air-fuel mixture layers in the engine cylinder. Under a low-temperature engine operating condition, for example with a cold engine in cold regions, the insufficient fuel-spray characteristics may result in lowering of lubricating performance owing to dilution of engine oil with fuel, which dilution results from collision of the fuel with the combustion-chamber wall, and produce increased exhaust emissions of smoke and particulates, resulting from a film of fuel adhered to the piston head, and thus the engine performance as well as the exhaust-emission control performance may be lowered.

SUMMARY OF THE INVENTION

Accordingly, it is an object of the invention to provide an improved cylinder direct-injection type spark-ignition internal combustion engine which avoids the foregoing disadvantages of the prior art.

In order to accomplish the aforementioned and other objects of the invention, a direct-injection type spark-ignition internal combustion engine comprises a cylinder head having an intake-valve port and an exhaust-valve port, a cylinder block having a cylinder, a piston moveable up and down within the cylinder, a spark plug disposed essentially in a center of a combustion chamber defined by a piston crown of the piston and the cylinder head, and a fuel-injection valve mounted on the cylinder head near and below the intake-valve port so that a spray hole of the injection valve opens through a combustion-chamber wall into the combustion chamber, and so that an uppermost line of fuel spray injected through the spray hole is set at a lower level than an electrode end of the spark plug and a lowermost line of the fuel spray is in spaced relationship with a cylinder inner wall close to the spray hole, wherein the piston crown is formed with a recessed portion and a raised flat-surface portion, the recessed portion facing the inlet-valve port essentially at a top dead center and receiving almost all of the fuel spray at a fuel-injection period near the top dead center, and the raised flat-surface portion facing the exhaust-valve port essentially at the top dead center and gradually up-sloped in a direction extending from the exhaust-valve port to the intake-valve port, wherein a ridge line is defined as an intersecting line between the recessed portion and the raised flat-surface portion, and the ridge line is offset from a center axis of the cylinder by a predetermined distance toward a side of the exhaust-valve port and raised by a predetermined height toward the cylinder head, and wherein a spray angle between the uppermost and lowermost lines is set within a predetermined angle range of 70°±20°. It is preferable that the ridge line is formed on the piston crown so that an outermost curved line of a collision area of the fuel spray on the piston crown intersects the ridge line during at least a fuel-injection period from initiation of fuel injection essentially to a crank angle of 120° after the top denial center. The piston crown may be formed with at least a raised flat-surface portion facing the exhaust-valve port essentially at a top dead center and gradually up-sloped in a direction extending from the exhaust-valve port to the intake-valve port, for defining a ridge line by a maximum raised edge of the raised flat-surface portion. A termination timing of fuel injection may preferably set within a crank-angle range of 90° to 120° after the top dead center. An angle-of-elevation, which is defined as an angle between a bottom face of the cylinder head and a center axis of the fuel-injection valve, may be set within an angle range of 35°±10°.

According to another aspect of the invention, a direct-injection type spark-ignition internal combustion engine comprises an intake-valve port formed in a cylinder head, an exhaust-valve port formed in the cylinder head, a cylinder block having a cylinder, a piston moveable up and down within the cylinder, a spark plug disposed between the intake-valve port and the exhaust-valve port and essentially in a center of a combustion chamber defined by a piston crown of the piston and the cylinder head, and a fuel-injection valve mounted on the cylinder head near and below the intake-valve port so that a spray hole of the injection valve opens through a combustion-chamber wall into the combustion chamber, wherein the intake-valve port is directed toward a cylinder inner wall closer to the exhaust-valve port for producing a vortex flow rotating from the cylinder inner wall toward the piston crown by colliding intake air coming from the intake-valve port with the cylinder inner wall, wherein the piston crown is formed with a recessed portion and a raised flat-surface portion, the recessed portion facing the inlet-valve port essentially at a top dead center, and the raised flat-surface portion facing the exhaust-valve port essentially at the top dead center and gradually up-sloped in a direction extending from the exhaust-valve port to the intake-valve port, and wherein a ridge line is defined as an intersecting line between the recessed portion and the raised flat-surface portion and the ridge line is offset from a center axis of the cylinder by a predetermined distance toward a side of the exhaust-valve port. Preferably, the ridge line may be up-sloped straight along a ceiling wall of a pent-roof shaped combustion chamber defined on a bottom of the cylinder head. It is preferable that the piston crown has an outer peripheral flat-surface portion formed at a higher level than the recessed portion and being cooperative with the combustion-chamber wall for defining an aperture on the piston crown at the top dead center to fling fuel spray up and to suppress adhesion of fuel to the cylinder inner wall, thus promoting atomization and vaporization of the fuel spray. A maximum edge of the ridge line may preferably be formed at a higher level than the spray hole at the top dead center. Also, the maximum edge of the ridge line may preferably be formed at a higher level than the outer peripheral flat-surface portion.

According to a further aspect of the invention, a direct-injection type spark-ignition internal combustion engine comprises an intake-valve port formed in a cylinder head, an exhaust-valve port formed in the cylinder head, a cylinder block having a cylinder, a piston moveable up and down within the cylinder, a spark plug disposed between the intake-valve port and the exhaust-valve port and essentially in a center of a combustion chamber defined by a piston crown of the piston and the cylinder head, and a fuel-injection valve mounted on the cylinder head near and below the intake-valve port so that a spray hole of the injection valve opens through a combustion-chamber wall into the combustion chamber, wherein the piston crown is formed with a recessed portion and a raised flat-surface portion, the recessed portion facing the inlet-valve port essentially at a top dead center, and the raised flat-surface portion facing the exhaust-valve port essentially at the top dead center and gradually up-sloped in a direction extending from the exhaust-valve port to the intake-valve port, wherein a ridge line is defined as an intersecting line between the recessed portion and the raised flat-surface portion and the ridge line is offset from a center axis of the cylinder by a predetermined distance toward a side of the exhaust-valve port, and wherein the intake-valve port is directed toward a cylinder inner wall closer to the exhaust-valve port for producing a first vortex flow (22) rotating from the cylinder inner wall toward the piston crown by colliding intake air coming from the intake-valve port with the cylinder inner wall and a second vortex flow (23) rotating from the ridge line toward a cylinder inner wall closer to the intake-valve port, on an intake stroke.

According to another aspect of the invention, a direct-injection type spark-ignition internal combustion engine comprises a cylinder head having an intake-valve port and an exhaust-valve port, a cylinder block having a cylinder, a piston moveable up and down within the cylinder, a spark plug disposed between the intake-valve port and the exhaust-valve port and essentially in a center of a combustion chamber defined by a piston crown of the piston and the cylinder head, and a fuel-injection valve mounted on the cylinder head near and below the intake-valve port so that a spray hole of the injection valve opens through a combustion-chamber wall into the combustion chamber, and so that an uppermost line of fuel spray injected through the spray hole is set at a lower level than an electrode end of the spark plug and a lowermost line of the fuel spray is in spaced relationship with a cylinder inner wall close to the spray hole, wherein a spray angle between the uppermost and lowermost lines is set within a predetermined angle range of 70°±20°, and wherein an angle-of-elevation, which is defined as an angle between a bottom face of the cylinder head and a center axis of the fuel-injection valve, is defined by an inequality $\alpha/2 \leq \theta \leq 90° - \alpha/2$, where $\alpha$ denotes the spray angle and $\theta$ denotes the angle-of-elevation. More preferably, the spray angle between the uppermost and lowermost lines may be set within a predetermined angle range of 65°±5°.

DESCRIPTION OF THE PREFERRED EMBODIMENTS

First Embodiment

Figure 1:
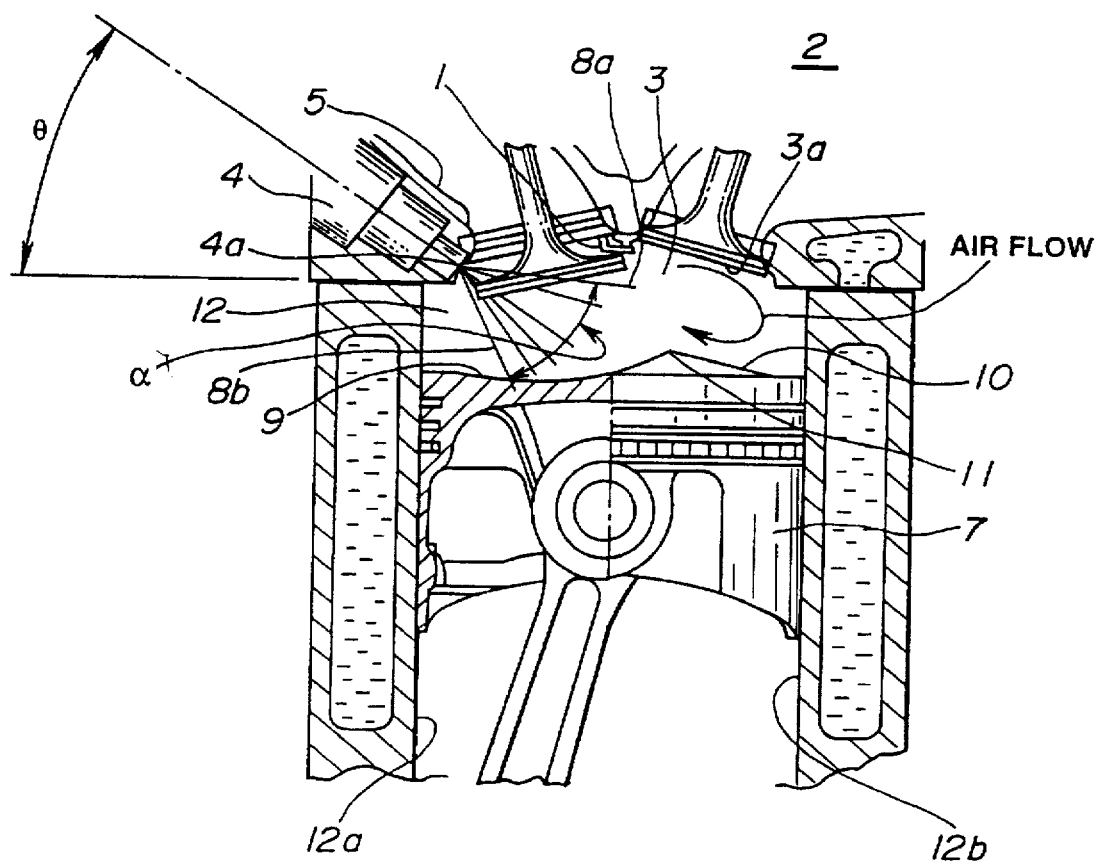
FIG. 1 is a longitudinal cross-sectional view illustrating a first embodiment of a cylinder direct-injection type internal combustion engine made according to the invention.

Referring now to the drawings, particularly to FIG. 1, the direct-injection type spark-ignition engine of the invention is exemplified in case of a four-valve, gasoline-fuel, spark-ignition internal combustion engine. For the purpose of comparison between the embodied engine and the prior art engine, the same reference numerals used in the prior art engine will be applied to the corresponding elements used in the embodiments. As seen in FIG. 1, in the direct-injection engine of the first embodiment, the ignition plug 1 is arranged essentially at the center of the combustion chamber 3. The engine is equipped with two intake ports 5, offsetting from the center axial line of the engine cylinder. The fuel-injection valve 4 is provided in the cylinder head in the vicinity of the intake-valve ports so that the spray hole 4a of the injection valve is directed toward the combustion chamber 3 from midway between the two intake ports (5; 5). The spray hole 4a is located at a lower level than the intake-valve ports 5 or in the vicinity of the intake valve ports. In the first embodiment shown in FIG. 1, the fuel-injection valve 4 is installed on the cylinder head 2 at an angle-of-elevation θ of 30°, whereas the fuel-spray angle α is preset at 60°. In case of an in-line engine where the central axis of each engine cylinder extends vertically, the angle-of-elevation (or elevation angle θ) is defined as an angle between the horizontal line (or the bottom face of the cylinder head or the upper face of the cylinder block) and the center axis of the fuel-injection valve 4. With the elevation angle θ set at 30° and the spray angle α set at 60°, the uppermost line 8a of the fuel spray is positioned at a lower level than the orthogonal line passing through the spray hole 4a and perpendicular to the center axial line of the engine cylinder. In case of an in-line engine where the central axis of each engine cylinder extends vertically, the orthogonal line corresponds to a horizontal line. This arrangement of the fuel-injection valve 4 prevents the fuel spray 8 from adhering to the bottom end face of the cylinder head 2 (or the upper wall 3a of the combustion chamber 3) and consequently reduces exhaust emissions of hydrocarbons (HC) and exhaust smoke, and also improve fuel consumption. In other words, in the direct-injection type spark-ignition engine of the first embodiment, the direction of installation of the injection valve on the cylinder head and the fuel-spray angle are properly determined in such a manner that the fuel spray never reaches within a region upper than the orthogonal line which passes through the spray hole 4a and is perpendicular to the center axis of the engine cylinder. A recessed portion 9 is formed on a left-hand side (viewing FIG. 1) of the piston head (or the piston crown) of the piston 7, in such a manner as to face the intake-valve port and to receive almost all of the fuel spray 8 essentially at the top dead center (TDC). The recessed portion 9 may be comprised of a downwardly-curved concavity. An upwardly-raised, moderately-sloped flat-surface portion 10 is formed on a right-hand side of the piston head in such a manner as to face the exhaust-valve port. The sloped flat-surface portion 10 is slightly raised to such a degree that the sloped flat-surface portion 10 of the piston 7 does not interfere with the combustion-chamber wall 3a at TDC. Reference numeral 11 denotes a ridge line which is defined as an intersecting line between the recessed portion 9 and the sloped flat-surface portion 10. The recessed portion 9 and the sloped flat-surface portion 10 are formed on the piston head such that the ridge line 11 is slightly offset, by a predetermined distance, from the spark plug 1, which plug is located on the center axis of the engine cylinder, towards the right-hand side (or the exhaust-valve port side). The operation of the direct-injection type spark-ignition engine of the first embodiment will be hereinafter described in detail.

Figure 2:
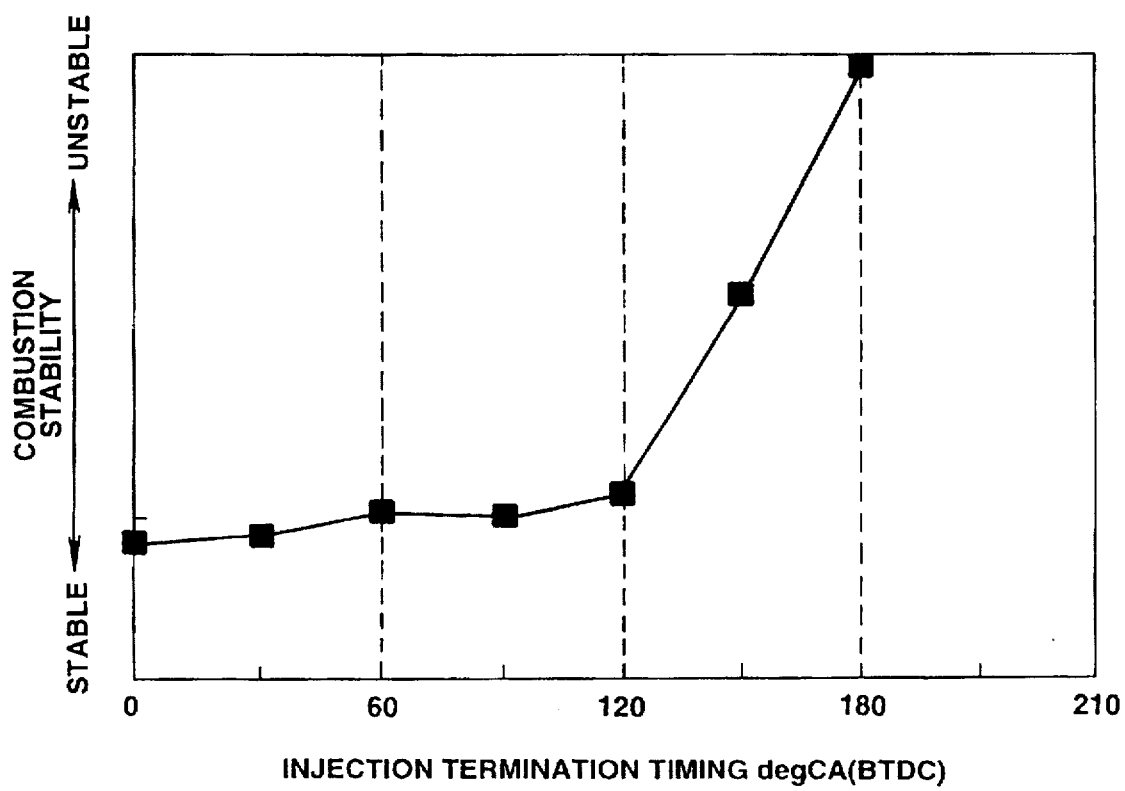
FIG. 2 is a graph showing the relationship between a fuel-injection termination timing and a combustion stability.
Figure 3A:
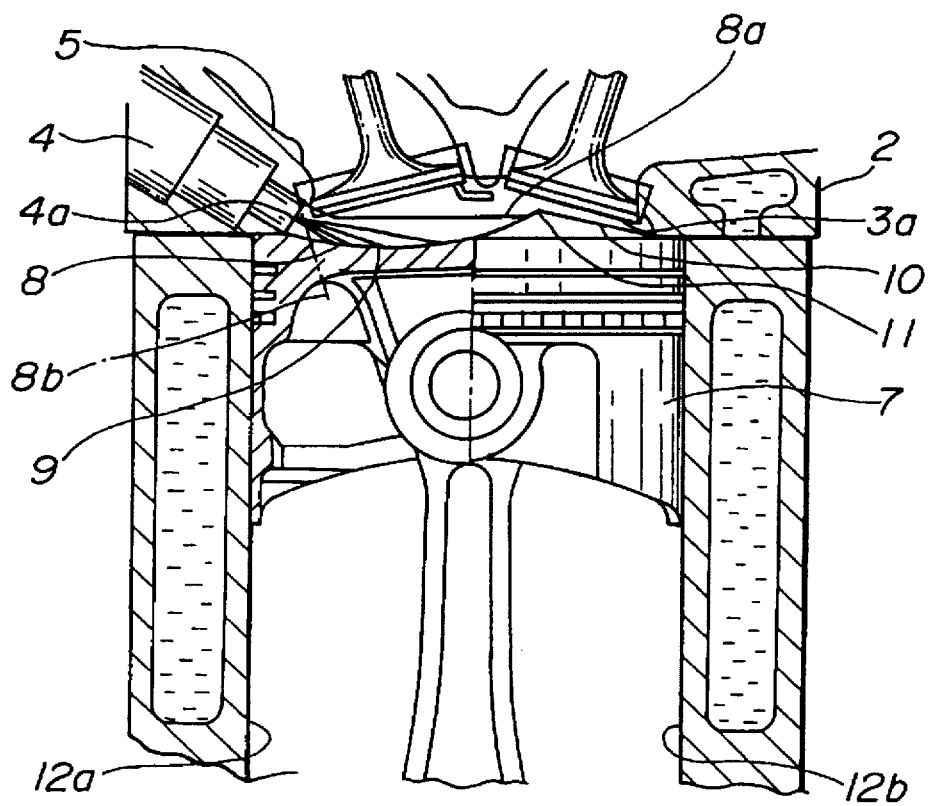
FIG. 3A is a cross-sectional view showing a state of the combustion chamber of the engine of the first embodiment in the vicinity of top dead center (TDC).
Figure 3B:
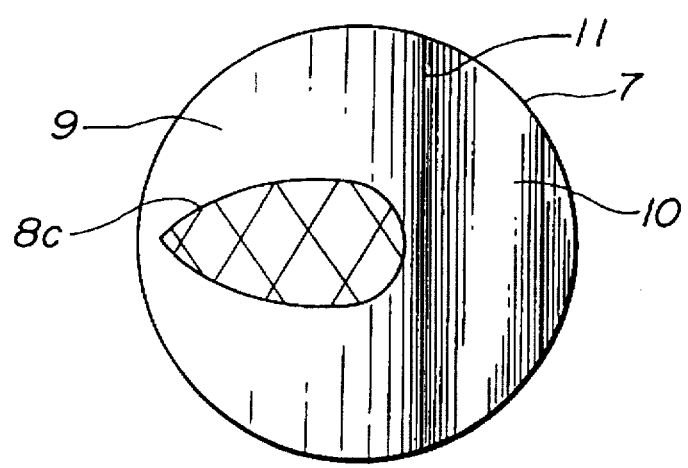
FIG. 3B is a schematic plan view showing the position relationship between a collision, region (8c) of fuel spray and a ridge line (11).
Figure 4:
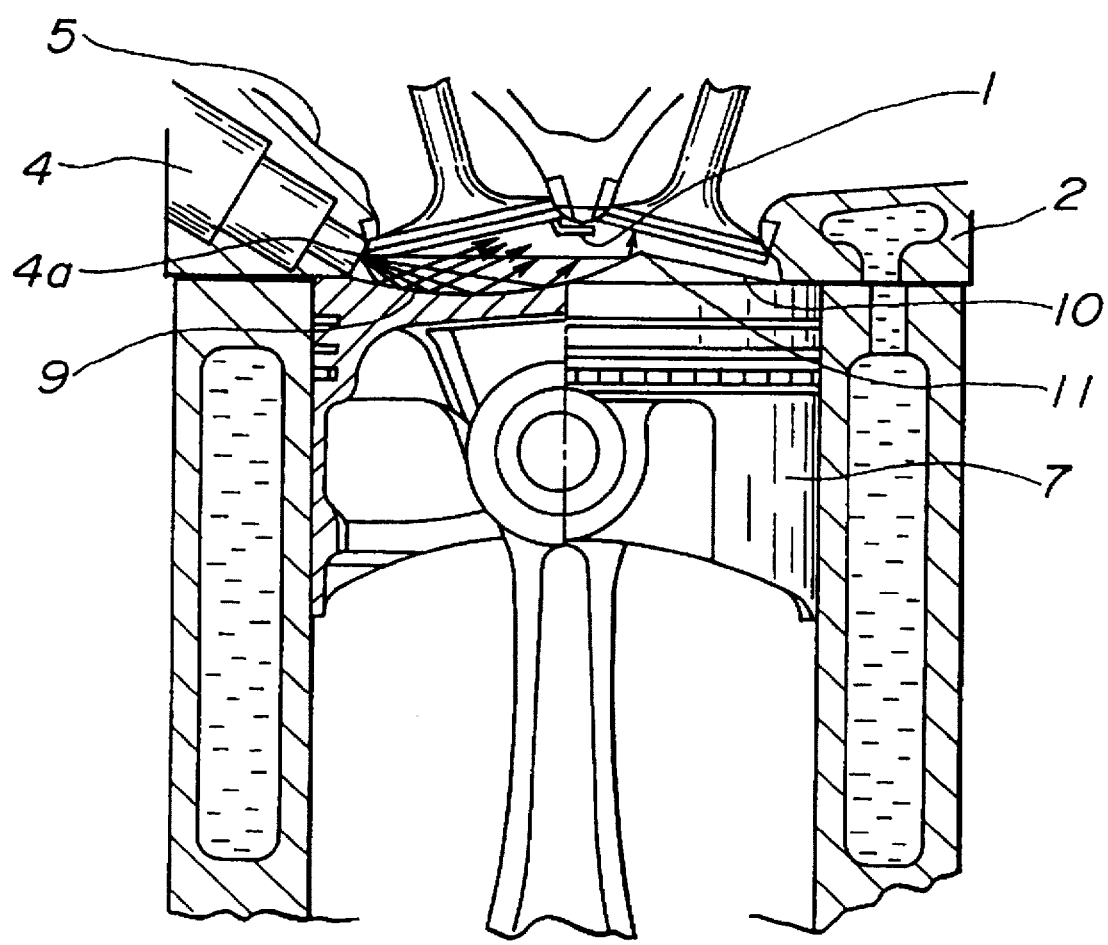
FIG. 4 is a cross-sectional view illustrating an up-flung state of fuel spray onto the piston head of the engine of the first embodiment.

As is well known, in direct-injection type spark-ignition engines, it is so important to improve the combustion stability in a less fuel-supply region, such as a low-speed low-load engine operation region such as during idling. As seen in FIG. 2, the highest combustion stability can be insured when the fuel-injection timing is timed to coincide with approximately TDC (i.e., the crank angle of 0°). Thus, it is important to properly manage or control the timing of fuel injection in the vicinity of TDC. According to the fuel-injection valve 4 included in the engine of the first embodiment, as shown in FIG. 3A, the direction of installation of the injection valve on the cylinder head, which direction is defined by the elevation angle θ, and the fuel-spray angle α are properly determined in such a manner that the fuel spray 8 is not injected directly toward within a region upper than the orthogonal line which passes through the spray hole 4a and is perpendicular to the center axis of the engine cylinder. In the event that the fuel-injection termination timing is slightly retarded from TDC and thus the piston is shifted downwardly from TDC, the fuel spray travel becomes shorter at the end of the fuel injection, in other words, the spray penetration becomes less, thus avoiding the fuel spray 8 from colliding with the engine-cylinder inner wall 12b closer to the exhaust-valve port. On the other hand, the lowermost line 8b of the fuel spray 8 is slightly inclined toward the exhaust-valve port with respect to the parallel line which line is parallel to the center axial line of the engine cylinder and passes through the spray hole 4a of the injection valve. In case of an in-line engine where the central axis of each engine cylinder extends vertically, the parallel line corresponds to a vertical line. Thus, the relative-position relationship of the lowermost line 8b can prevent the fuel spray 8 from directly colliding with the engine-cylinder inner wall 12a closer to the intake-valve port. The height and the relative position of the ridge line 11 are designed in a manner so as to receive almost all of the fuel spray 8 by the recessed portion 9 substantially at TDC, and thus the fuel spray 8 is properly restricted by the ridge line 11. The proper restriction of the ridge line 11 can effectively suppress adhesion of the fuel to the combustion-chamber wall 3a, or to the cylinder inner walls 12a and 12b. This reduces exhaust emissions such as smoke and hydrocarbons in the exhaust gas and suppress lubricating oil from being diluted with the fuel as much as possible. As shown in FIG. 4, the fuel spray 8 collides with the recessed portion 9 and is thus atomized, with the result that the particle velocities of atomized fuel particles are decreased and the atomized fuel particles are flung up and floats in the cylinder. The floating atomized fuel particles are sufficiently mixed with the intake air induced through the intake ports. This ensures better burning of the fuel, in comparison with the prior art direct-injection type spark-ignition engine. Additionally, since the ridge line 11 is offset from the spark plug 1 by a predetermined distance, toward the exhaust-valve port side, the vaporized fuel tends to be easily concentrated around the spark plug. This greatly improves an ignitionability of the engine. As appreciated from test results shown in FIG. 5, during operation at the high engine-load, in case of the improved engine of the piston-head shape as previously explained, the exhaust smoke density is remarkably reduced within the crank angles, ranging from TDC (the crank angle of 0°) to the crank angle of 120° after TDC, in comparison with the prior art engine with a flat piston head. The latter crank-angle range (120° after TDC) which insures remarkable smoke-reduction effect, corresponds to a piston position where the piston 7 is positioned in the vicinity of the injection valve 4 or corresponds to an especial case in which greatly-increased gas flow takes place within the cylinder 12 owing to the piston 7 moving at a comparatively faster speed. Actually, the smoke-reduction effect obtained before and behind the crank angle of 120° after TDC is attained by the greatly increased gas flow resulting from the faster moving piston 7. For the reasons set out above, in order to reduce exhaust smoke during the high engine-load operation, it is desirable to orient the center axis of the fuel spray 8 toward the piston-head rightmost end being farthest from the injection valve 4 and closest to the exhaust-valve port (see FIG. 6A), in consideration of adhesion of fuel to the cylinder inner wall and adhesion of fuel to the combustion-chamber wall. To achieve this, it is more preferable to set the elevation angle θ within an elevation-angle range of 35°±10°. In the first embodiment, the elevation angle θ is set at 30°. In the case of the elevation angle of 30°, it is preferable to set the maximum value of the fuel-spray angle α at 70° so that the uppermost line 8a of the fuel spray 8 is kept at a lower level than the orthogonal line passing through the spray hole 4a and perpendicular to the center axial line of the engine cylinder. It is preferable that the spray angle α is within an angle range of 50° to 90° (i.e., 70°±20°), in case that the elevation angle θ is within an angle range of 25° to 35°. As set forth above, the engine of the first embodiment can enhance the responsiveness of the engine under a transient engine operating condition owing to a high fuel-delivery response inherent in the direct-injection type spark-ignition engine. The good burning of stratified charge can ensure lean-burn, thus improving fuel consumption. Furthermore, the fuel-injection valve 4 is mounted on the cylinder head 2 within the elevation-angle range of 35°±10°, so that the spray hole 4a is located below the intake-valve ports 5 or near the intake-valve ports and provided in the vicinity of the top end of the peripheral wall portion of the cylinder block (or in the vicinity of the top end of the cylinder bore) and so that the spray hole 4a exposes into the combustion chamber through the combustion-chamber wall, while the spray angle α is set within an angle range of 70°±20°. As a result of this, the fuel spray 8 can be injected within towards a designated zone lower than the orthogonal line which passes through the spray hole 4a and is perpendicular to the center axis of the engine cylinder. As seen in FIG. 1, the electrodes of the spark plug 1 are kept at a higher level than the designated fuel-spray zone, to prevent the plug 1 from getting wet through unvaporized fuel. In addition, the recessed portion 9 (preferably the downwardly-curved concave portion) is formed on the left-hand side of the piston head in such a manner as to face the intake-valve port and to receive almost all of the fuel spray 8 essentially at the TDC, while the upwardly raised, moderately-sloped flat-surface portion 10 is formed on the right-hand side of the piston head in such a manner as to face the exhaust-valve port and to be slightly raised to such a degree that the sloped flat-surface portion 10 does not interfere with the combustion-chamber wall 3a at TDC. In addition to the above, the ridge line 11, which is defined as the intersecting line or the line-of-intersection between the recessed portion 9 and the sloped flat-surface portion 10, is slightly offset from the spark plug 1 by the predetermined distance toward the exhaust-valve port side. With the previously-noted arrangement, during the fuel-injection period about at the TDC, the engine of the first embodiment can suppress the fuel already present in the cylinder from adhering to the combustion-chamber wall 3a or to the cylinder inner walls 12a and 12b, as much as possible. This effectively reduces the exhaust smoke density and suppresses undesired dilution of lubricating oil with the fuel. Due to collision of the fuel spray with the recessed portion 9, the fuel spray is effectively atomized and flung up and floats in the cylinder, and thus such an atomization promotes vaporization of the fuel spray. The atomized and up-flung fuel particles are effectively concentrated around the spark plug 1, thus ensuring a good burning of the mixture of air and fuel vapor. As a consequence, the combustion performance and the ignition-ability can be greatly improved.

Second Embodiment

Figure 6A:
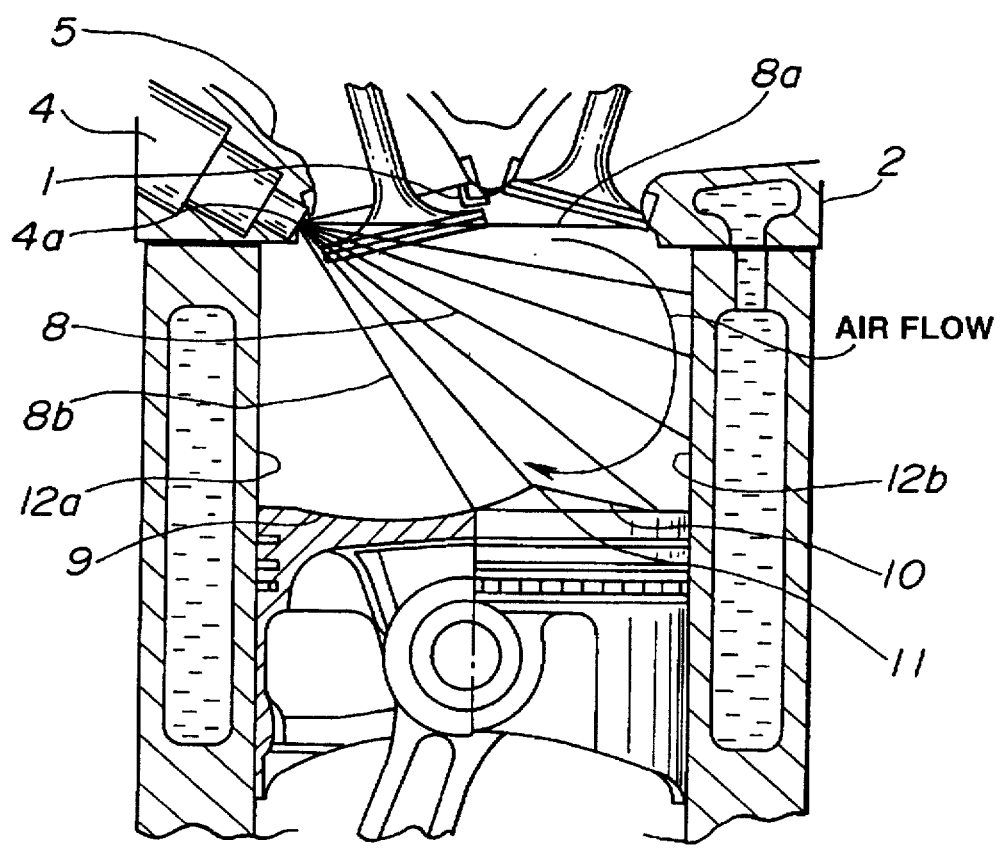
FIG. 6A is a cross-sectional view illustrating a state of the combustion chamber of a direct-injection type engine of a second embodiment during the fuel-injection period approximately at the crank angle of 120° after top dead center (TDC).
Figure 6B:
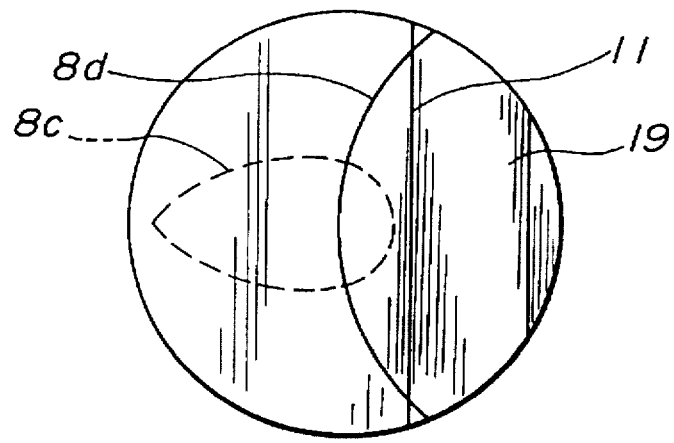
FIG. 6B is a schematic plan view showing the position relationship between a collision region (8d) of fuel spray and a ridge line (11) during the fuel-injection period approximately at the crank angle of 120° after TDC.

The piston structure of the direct-injection type spark-ignition engine of the second embodiment shown in FIGS. 6A and 6B is different from that of the first embodiment, in that the position of the ridge line 11 of the piston structure of the second embodiment is determined or restricted strictly in consideration of the collision area or region 8d of the fuel spray 8 during the injection period almost at the crank angle of 120° after TDC. In comparison with the second embodiment, the position of the ridge line 11 of the piston structure of the first embodiment is not restricted strictly. In other words, the piston structure of the first embodiment can insure a comparatively high freedom of design. As seen in FIGS. 6A and 6B, the position of the ridge line 11 of the piston structure of the second embodiment is designed or determined such that the ridge line 11 is able to intersect the outermost lower curved line 8d of the collision zone of the fuel spray with the piston head during the fuel-injection period approximately at the crank angle of 120° after TDC, and such that the ridge line 11 is slightly offset from the center axial line of the cylinder toward the exhaust-valve port side. As can be appreciated from two collision areas 8c (indicated by the broken line) and 8d (indicated by the solid line) in FIG. 6B, it may be appreciated that the collision area 8d, which is obtained about at the crank angle of 120° after TDC, is necessarily offset rightward in comparison with the collision area 8c which is obtained essentially at TDC. The other structure of the second embodiment is identical to the first embodiment. In addition to the same effects as the first embodiment, the piston structure of the second embodiment can provide another effect. That is to say, since some of the fuel spray 8 can be collided with the recessed portion 9 even during high-speed, high-load engine running state in which the time duration of fuel injection is comparatively longer, the induced air and the sprayed fuel are effectively mixed with each other and vaporization of the atomized fuel particles are promoted by virtue of atomization and flung-up motion, and thus the amount of exhaust smoke can be greatly reduced. In other words, a proper position of the ridge line 11 can insure a fuel-spray collidable zone (corresponding to the area of the left-hand side from the ridge line 11) with respect to the recessed portion 9 even during high-speed, high-load engine running state in which the fuel injection terminates essentially at the crank angle of 120° after TDC.

In the first and second embodiments, although the direct-injection type spark-ignition engine of the invention is exemplified in case of a four-valve, gasoline-fuel, spark-ignition internal combustion engine, it will be appreciated that the engine structure of the invention may be applied to a two-valve, gasoline-fuel, spark-ignition internal combustion engine or to a two intake-valve, one exhaust-valve, gasoline-fuel spark-ignition internal combustion engine. Furthermore, in the first and second embodiments, although the recessed portion 9 and the upwardly-raised, moderately-sloped flat-surface portion 10 are both formed on the piston head, at least an upwardly-raised portion 10 may be formed on the exhaust-valve port side of the piston head such that the raised flat-surface portion 10 is gradually up-sloped from the outer periphery of the piston to the center of the piston and raised toward the cylinder head, and such that the maximum raised edge of the raised flat-surface portion 10 defines a ridge line 11, and such that the ridge line 11 is offset from the center axial line of the cylinder by a predetermined distance toward the exhaust-valve port side, and that the maximum raised portion does not interfere with the combustion-chamber wall at the top dead center.

Referring now to FIGS. 7A, 7B, 17A and 17B, there are shown details of the piston-head structure that is optimally applicable to the direct-injection type spark-ignition engine of the first and second embodiments. As may be appreciated from FIGS. 7A, 7B, 17A and 17B, the piston-head structure (namely a shape and geometry) and the relative-position relationship between the ridge line 11 and the spray hole of the injection valve 4 are more strictly defined.

Figure 7A:
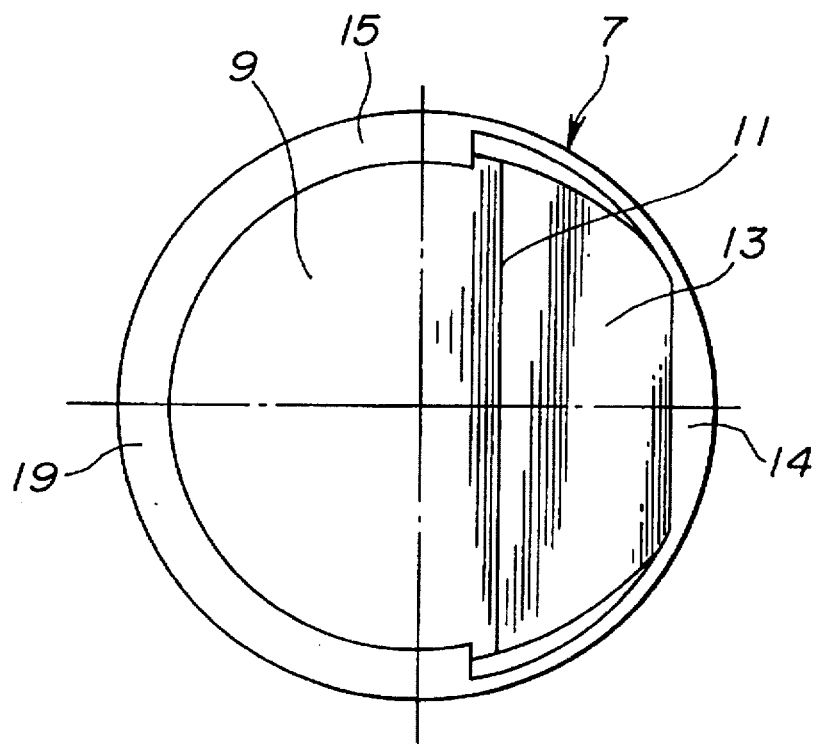
FIGS. 7A and 7B are a plan view and a longitudinal partial cross-sectional view, showing details of the shape of a piston head of the direct-injection type engine.
Figure 7B:
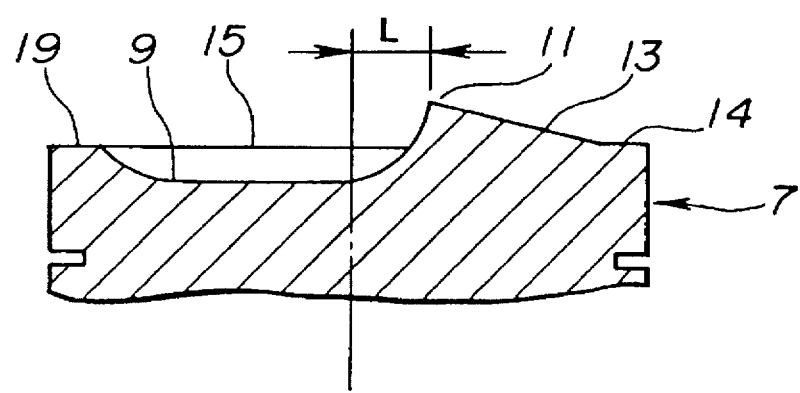

Referring to FIGS. 7A and 7B, the piston 7 is formed on its head with a squish portion or a squish area 19 and a recessed portion 9 formed continuously from the squish portion 19. The recessed portion 9 is comprised of an essentially horizontally-extending flat bottom section, a smooth curved section inwardly extending from the squish portion 19 down to the flat bottom section, and a greatly upwardly curved section (corresponding to the rightmost section of the recessed portion 9). The rightmost greatly upwardly curved section of the recessed portion 9 is cooperative with an up-sloped flat-surface portion 13 so as to define the ridge line 11. As clearly seen in FIG. 7B, the ridge line 11 is defined in such a manner as to be offset from the center axial line of the cylinder by a predetermined distance L. The recessed portion 9 is formed into a substantially cylindrical shape such that the flat bottom section of the recessed portion 9 extends at an identical level in a specified direction perpendicular to the direction oriented from the intake valve 16 to the exhaust valve 17. Actually, the specified direction corresponds to the axial direction of the piston pin. The direction of the ridge line 11 is equivalent to the previously-noted axial direction of the piston pin. In addition, the ridge line 11 is defined such that the uppermost end of the ridge line 11 is kept at a higher level than the spray hole 4a of the injection valve 4 at the top dead center (TDC). As a result of this, when the fuel is injected or sprayed at or near TDC, almost all of the fuel spray is first collided with the recessed portion 9 to effectively produce atomized fuel particles. Second, the fuel spray collided with the recessed portion 9, is dammed up or interrupted by the ridge line 11 and directed upwardly from the ridge line 11 so as to fling the atomized fuel particles up, and to float the flung-up atomized fuel particles in the cylinder. Therefore, the piston-head structure shown in FIGS. 7A and 7B suppresses the fuel spray from reaching and adhering to the cylinder inner wall or the cylinder-bore wall. The up-sloped flat-surface portion 13 is formed on the exhaust-valve port side of the piston head in such a manner as to extend straight and to be contoured along the ceiling wall of the pent-roof shaped combustion chamber, and to be continuously connected to another squish area 14 facing the exhaust-valve port. Also formed on the piston head at a higher level than the recessed portion 9 is a circumferentially-extending outer peripheral flat-surface portion 15. The outer peripheral flat-surface portion 15 is cooperative with the inner wall of the cylinder head (or the combustion-chamber wall) to define a slight aperture on the piston head at TDC. As seen in FIG. 7B, the previously-noted ridge line 11 is formed on the piston crown (or the piston head) at a higher level than the outer peripheral flat-surface portion 15 and extends to such an extent that both endmost portions of the ridge line 11 intersect the outer peripheral flat-surface portion 15. With the piston-head structure as shown in FIGS. 7A and 7B, the combustion performance (combustion stability) and exhaust emission control performance (reduction of exhaust smoke and unburnt HC) are greatly improved as hereinbelow discussed in detail.

Figure 8:
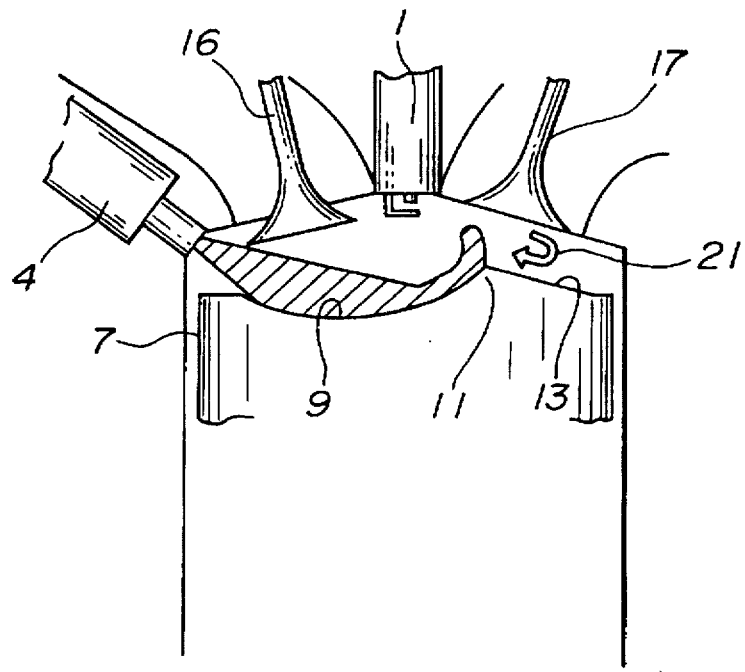
FIG. 8 is a simplified illustration of a state of fuel spray injected toward the piston head on the intake stroke almost at TDC.
Figure 13:
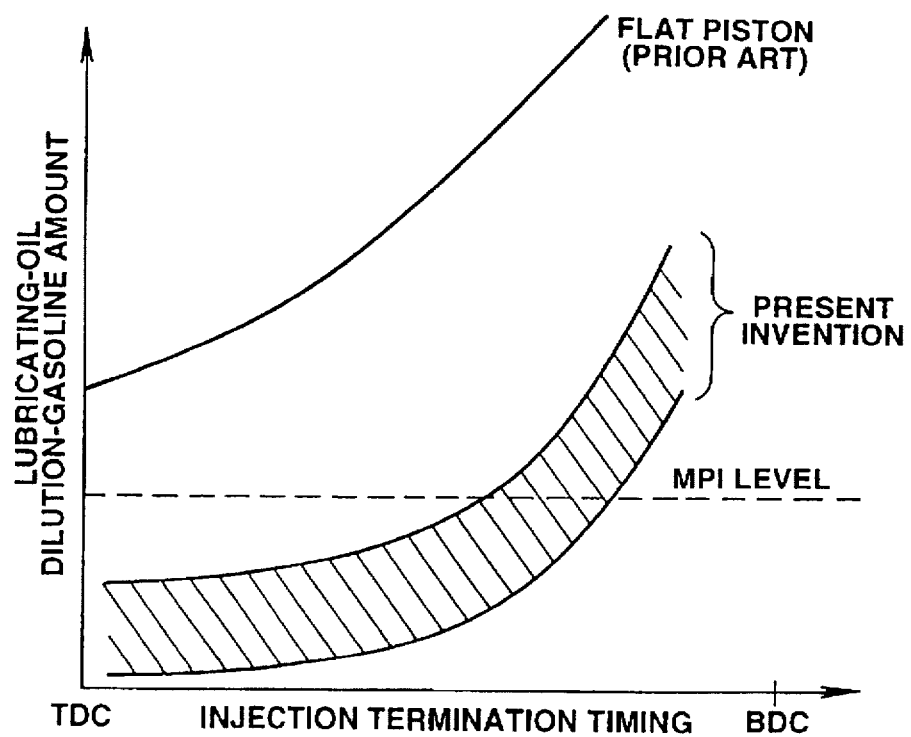
FIG. 13 is a graph illustrating a fuel-injection termination timing versus lubricating-oil dilution-gasoline amount characteristic curve.
Figure 14:
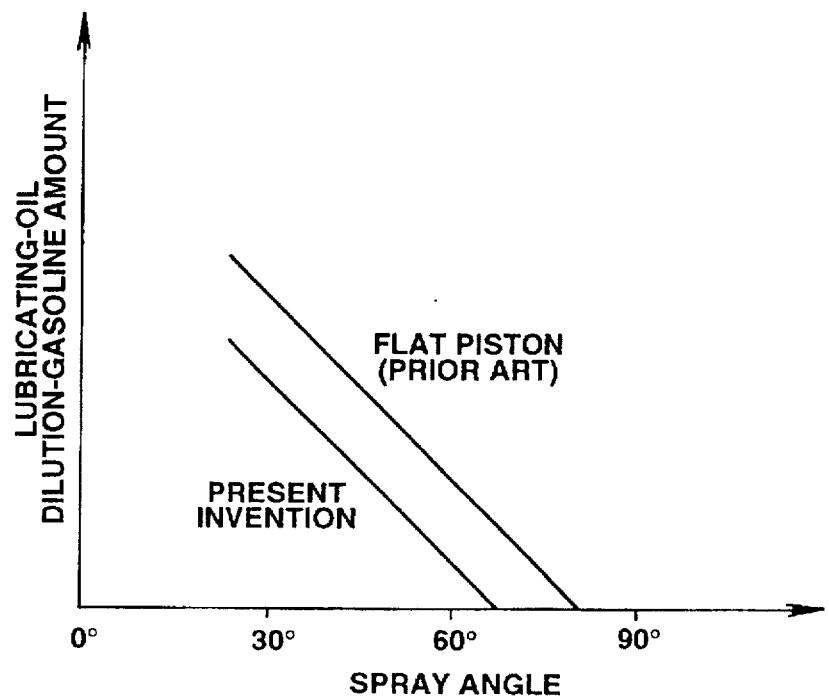
FIG. 14 is a graph illustrating a spray-angle versus lubricating-oil dilution-gasoline amount characteristic curve.
Figure 20:
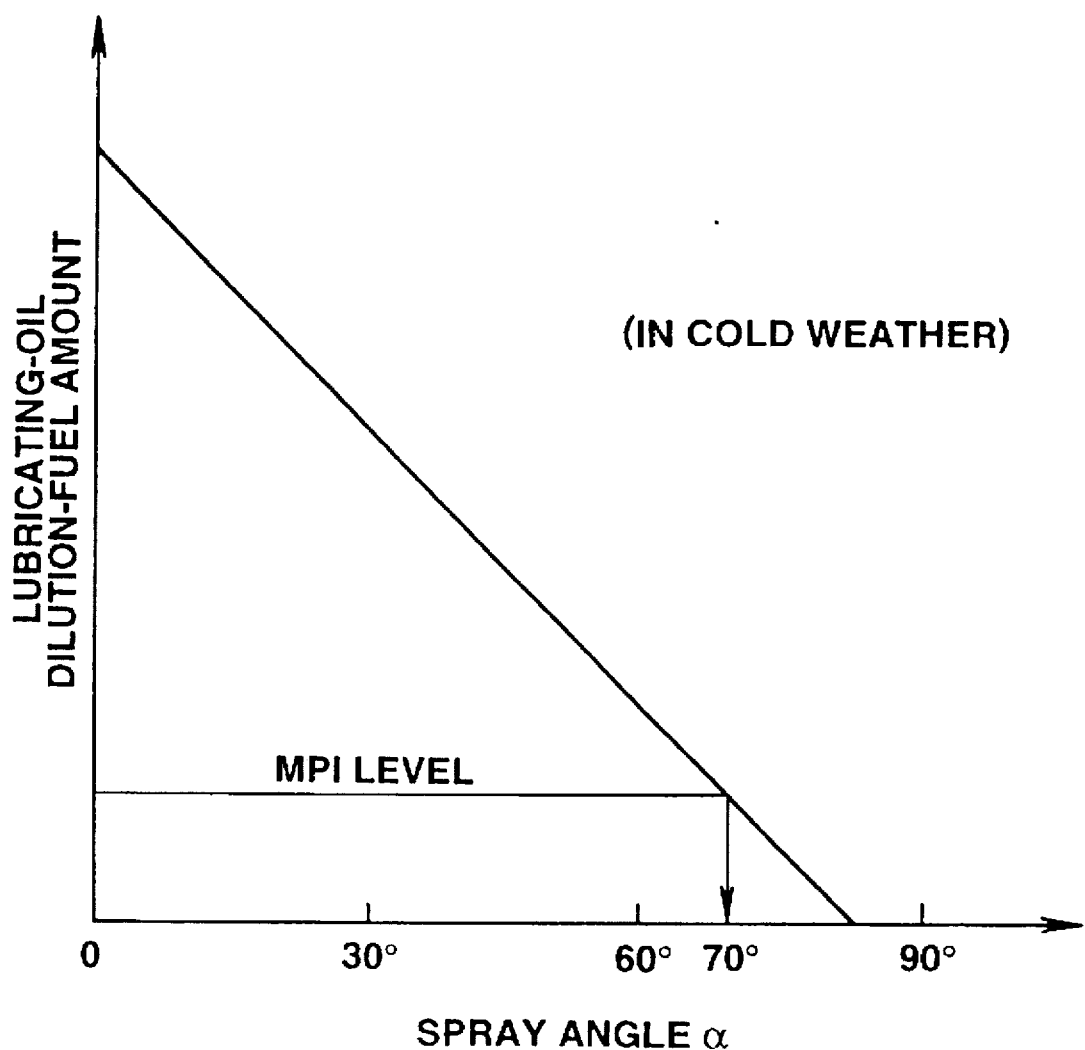
FIG. 20 is a graph illustrating a spray-angle ($\alpha$) versus lubricating-oil dilution-gasoline amount characteristic in cold weather.

As seen in FIG. 8, when the fuel is injected or sprayed into the combustion chamber with the piston 7 moved at or near the top dead center (TDC), the fuel spray is injected onto the recessed portion 9 and upwardly guided along the smooth surface of the recessed portion 9. The fuel spray flowing along the recessed portion 9, is dammed up by the ridge line 11. Thereafter, the fuel-spray flow, which may be directed toward the exhaust valve 17, is effectively restricted or suppressed by upward air flow resulting from small longitudinal intake-air vortex flow 21, turning clockwise, which vortex flow is produced within a left-hand side narrow space of the combustion chamber (viewing FIG. 8). The narrow space is defined between the up-sloped flat-surface portion 13 and the cylinder-head inner wall facing the flat-surface portion 13 essentially at TDC. Simultaneously, the fuel spray is upflung by virtue of the squish portions 14 and 19 and the outer peripheral flat-surface portion 15 and floats in the combustion chamber, thus suppressing adhesion of the fuel to the cylinder-bore wall (or the cylinder inner wall). For the reasons set out above, the improved piston-head structure can avoid fuel from directly adhering to the combustion-chamber wall and/or to the cylinder-bore wall. As can be appreciated from test results shown in FIG. 13, when the fuel-injection period is almost at TDC on the intake stroke, the improved piston structure can largely reduce the amount of gasoline fuel diluted with engine lubricating oil, in comparison with the prior-art flat piston structure. The amount of gasoline fuel diluted with lubricating oil will be hereinbelow referred to as a "lubricating-oil dilution-gasoline amount". The lubricating-oil dilution-gasoline amount is derivable or computable by subtracting a first fuel amount, which is estimated by way of component analysis of exhaust gases flowing through the exhaust port, from a second fuel amount which corresponds to an actual amount of fuel injected through the injection valve into the combustion chamber. Therefore, the deviation between the second fuel amount (the actual amount of fuel injected) and the first fuel amount (the estimated fuel amount) can be regarded as an amount of gasoline fuel which may be mixed or diluted with lubricating oil. In FIGS. 13 and 20, a specified level of the lubricating-oil dilution-gasoline amount, which level is denoted by MPI LEVEL, means a standard level of the lubricating-oil dilution-gasoline amount in case of a so-called multi-point injection type gasoline-fuel, spark-ignition engine in which fuel is injected into an intake system (such as an intake manifold) but not directly injected into combustion chambers. As appreciated from the spray-angle versus lubricating-oil dilution-gasoline amount characteristic shown in FIG. 14, the improved piston structure with the recessed portion 9, the raised portion 13, and the ridge 11 is superior to the prior-art flat-piston type engine, regardless of any spray angles, for example ranging from 0° to 90°. The improved piston structure can reduce the lubrication-oil dilution-gasoline amount even in case of a comparatively narrower spray angle α at which the spray penetration is great. In other words, the improved piston structure can ensure a high freedom of designing of the spray angle of the injection valve.

Figure 5:
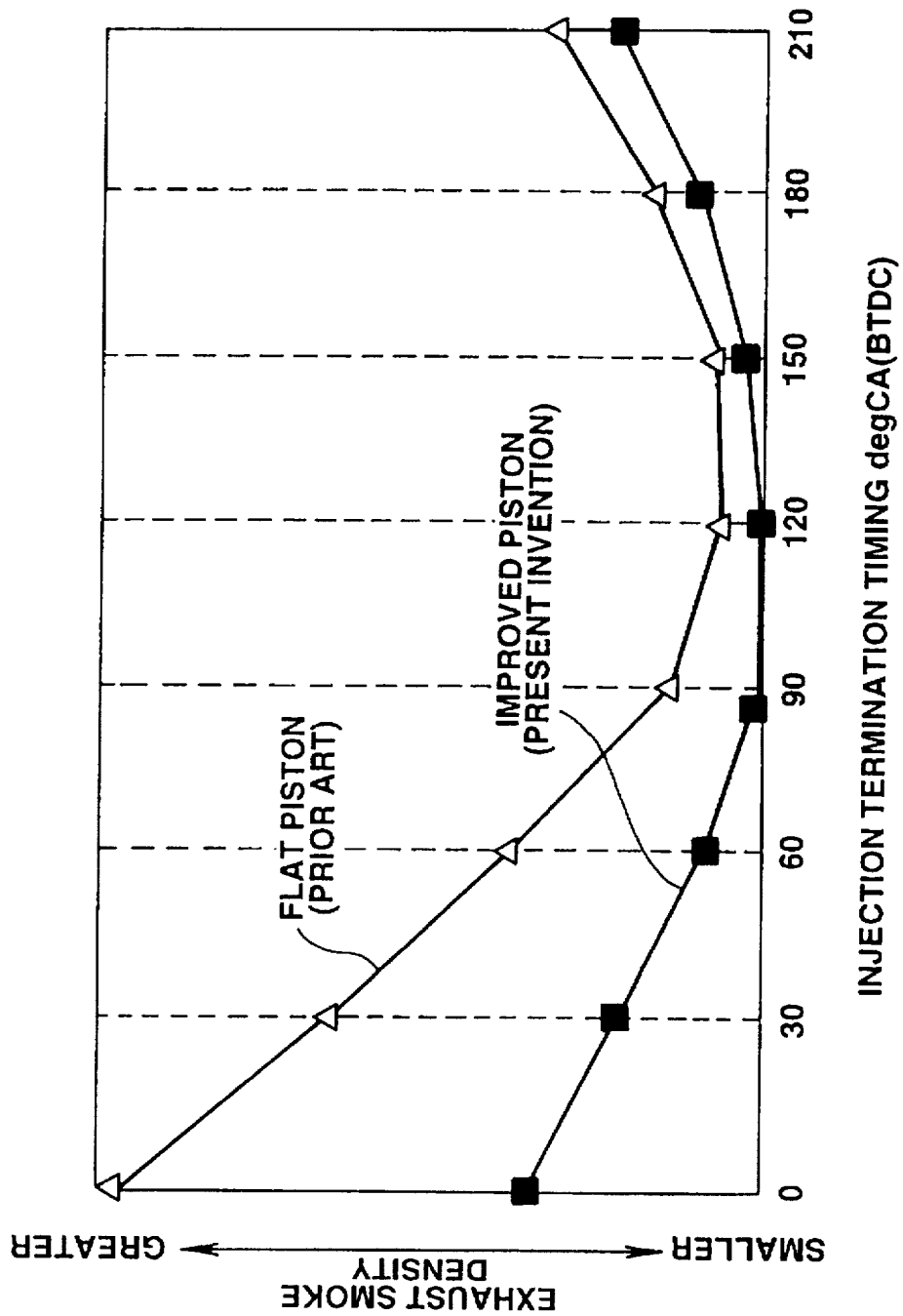
FIG. 5 is a graph illustrating the relationship between a fuel-injection termination timing and an amount of exhaust smoke produced during operation at high engine load.
Figure 9:
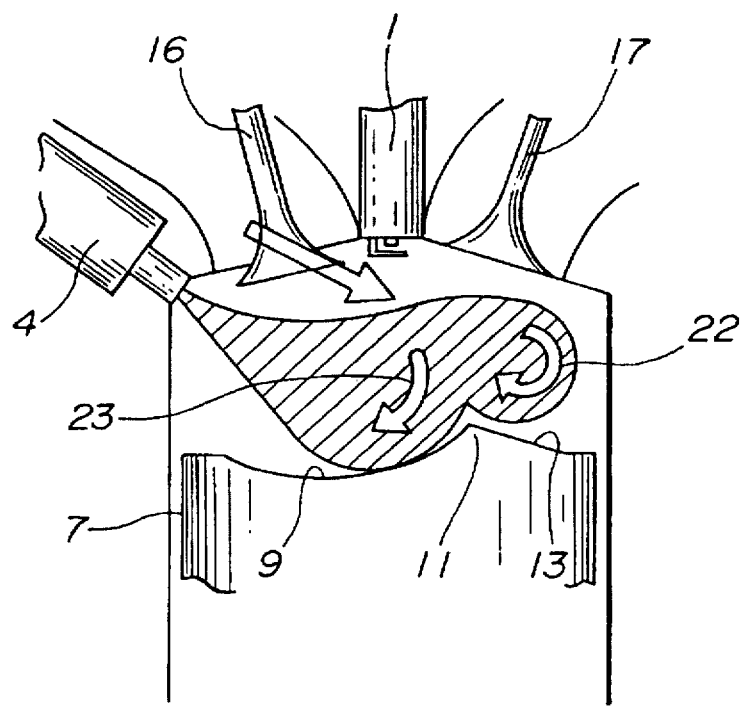
FIG. 9 is a simplified illustration of a state of fuel spray at the first half of the intake stroke.
Figure 10:
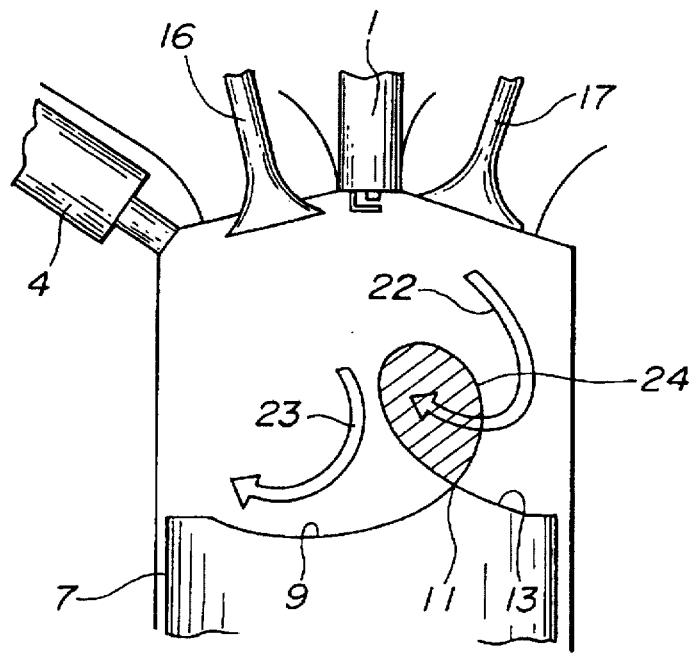
FIGS. 10 and 11 are simplified illustrations explaining a process of formation of vaporized fuel mass.
Figure 11:
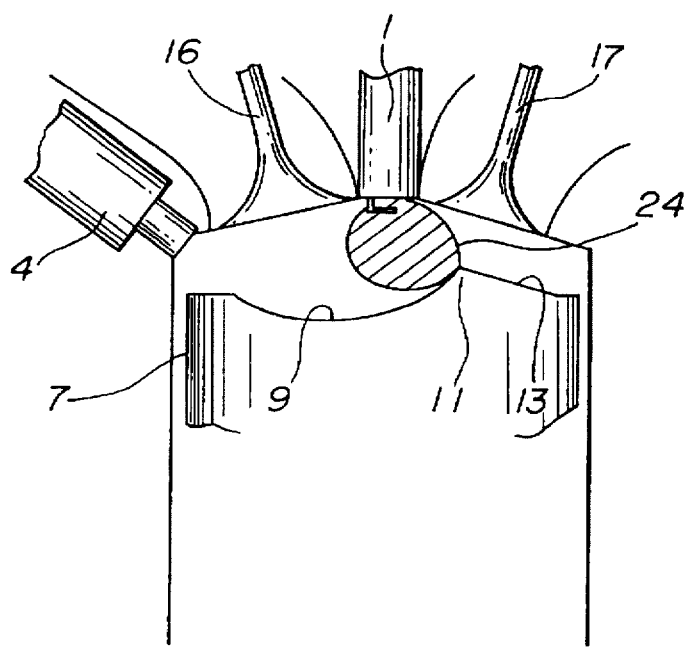
Figure 12:
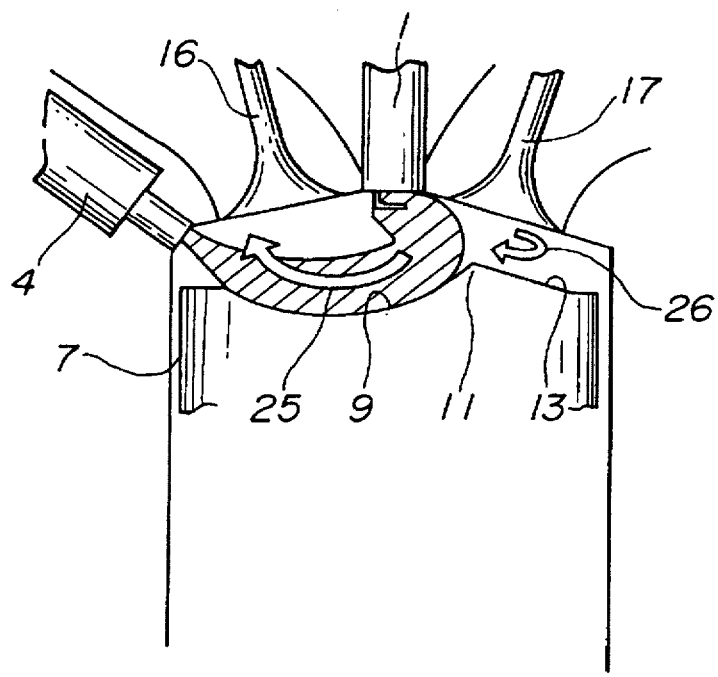
FIG. 12 is a schematic illustration of a state of fuel spray which is injected into the combustion chamber substantially at the ignition timing.
Figure 15:
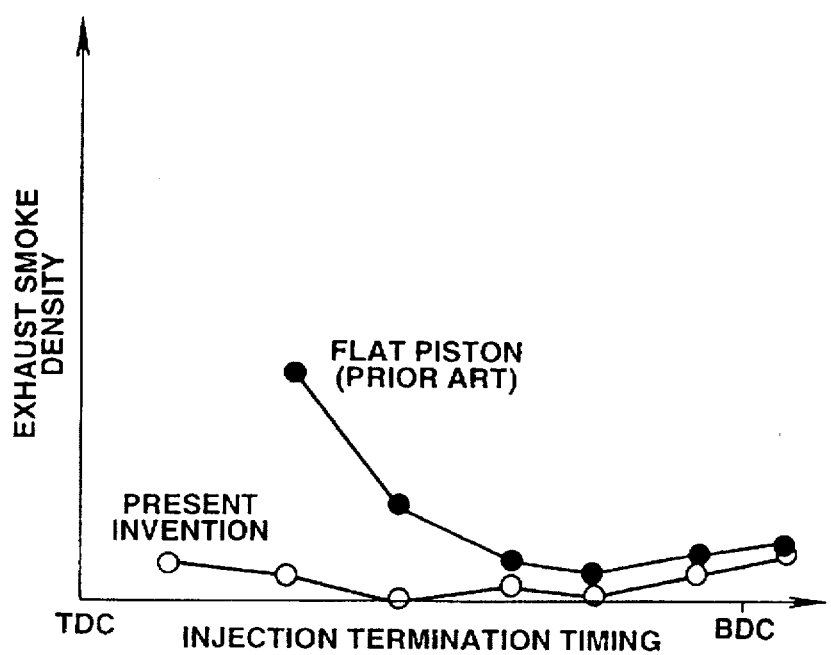
FIG. 15 is a graph illustrating an injection-timing versus exhaust smoke density characteristic curve.
Figure 16:
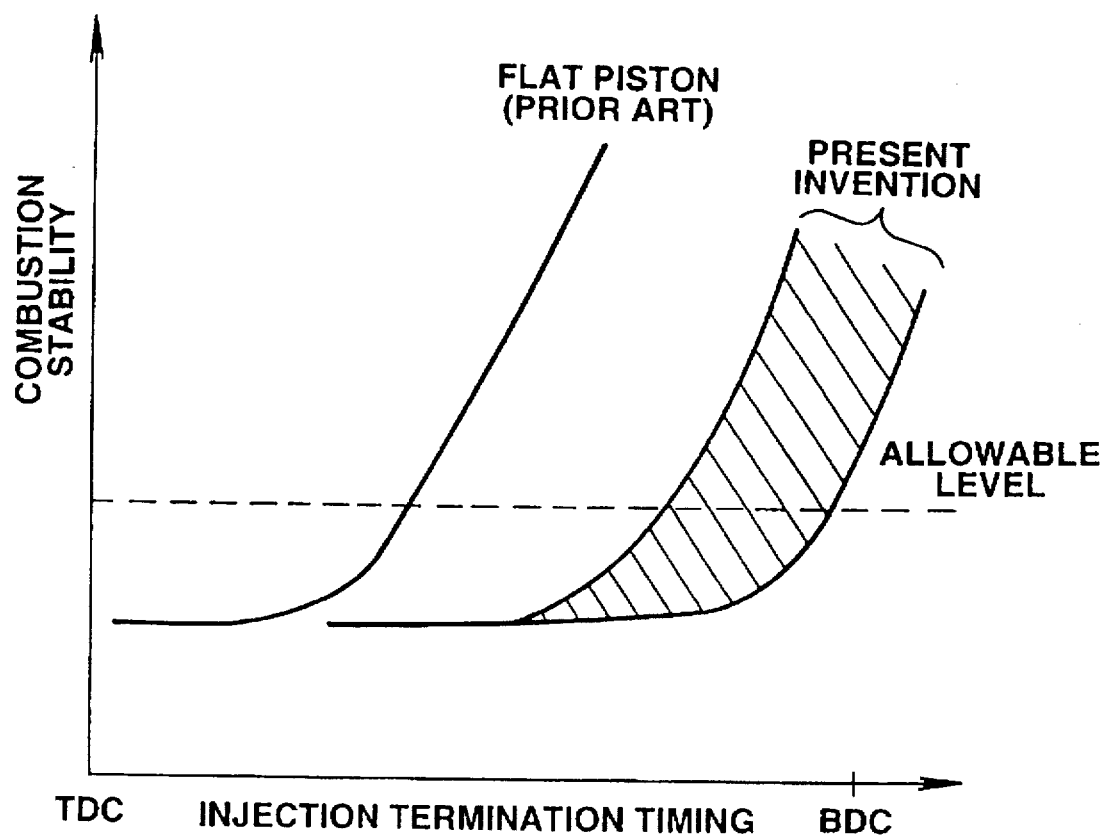
FIG. 16 is a graph illustrating a fuel-injection termination timing versus combustion stability characteristic curves, comparing the improved engine of the present invention with the prior art engine.

FIG. 9 shows a flow of the fuel spray which is injected into the combustion chamber at the first half of the intake stroke. As indicated by the arrows in FIG. 9, the intake-valve port is designed in combination with the piston crown and the cylinder inner walls especially the cylinder inner wall 12b closer to the exhaust-valve port, such that the induced air flow coming from the intake-valve port produces or creates two useful longitudinal intake-air vortex flows 22 and 23 in the combustion chamber. Owing to the two longitudinal intake-air vortex flows 22 and 23, the fuel spray is divided into two fuel-spray masses. The longitudinal intake-air vortex flow 22 begins to develop when the intake air coming from the intake port is brought into collision with the cylinder inner wall 12b closer to the exhaust port, and first turns downwards and then directed upwards along the up-sloped flat-surface portion 13. In other words, the intake-valve port is formed to efficiently produce vortex flow 22 in cooperation with the cylinder inner wall 12b. The longitudinal intake-air vortex flow 23 functions to suppress a first fuel-spray mass surrounded by the longitudinal intake-air vortex flow 22 from directly colliding with electrodes (namely a side electrode and a center electrode) of the spark plug 1. This eliminates the problem of excessive adhesion of the fuel to the electrodes of the spark plug. Therefore, as appreciated from test results shown in FIG. 15, the engine of the improved piston-head structure can reduce the exhaust smoke density when the fuel is injected or sprayed into the combustion chamber at the first half of the intake stroke. In such a fuel-injection period, the slightly enlarged distance between the spray hole 4a of the injection valve 4 and the recessed portion 9 formed on the piston crown, results in the decreased wetted-thickness of a film of fuel adhered to the piston crown due to the fuel-spray collided therewith. Therefore, the exhaust smoke density can be greatly reduced. In FIGS. 2, 5, CA(BTDC) denotes a crank angle before TDC. In FIGS. 13, 15 and 16, TDC denotes top dead center, whereas BDC denotes bottom dead center. When the piston moves down from the position shown in FIG. 9 to the position shown in FIG. 10 and then moves up towards TDC, a vaporized fuel mass 24 is created in the vicinity of the ridge line 11 due to the two longitudinal intake-air vortex flows 22 and 23 serving as tail-wind and head-wind with respect to the fuel-spray flow. Thereafter, as the piston approaches TDC on the compression stroke, the vaporized fuel mass 24 is gradually shifted toward the electrodes of the spark plug 1 (see FIG. 11). The vaporized fuel mass created near the ridge line 11 can ensure an optimum combustion even in case of earlier fuel-injection timing. In other words, the vaporized fuel mass, created near the ridge line 11, serves as a relatively rich strata or layers (or a relatively rich air-fuel mixture), and the rich mixture is efficiently concentrated around the spark plug in synchronization with the ignition timing. As seen in FIG. 16, the improved engine structure (especially the piston-head structure) can insure a higher combustion stability. In FIG. 16, a region below the allowable level means a relatively stable region, whereas a region above the allowable level means a relatively unstable region. On the contrary, when the fuel is injected into the combustion chamber almost at the ignition timing, the fuel spray advances toward the spark plug 1 along the recessed portion 9 against the longitudinal intake-air vortex flow 25, with the result that atomization and vaporization of the fuel spray are promoted and a vaporized fuel mass suitable for complete burning is created. This eliminates the problem of excessive adhesion of the fuel to the electrodes of the spark plug and the problem of wet plug resulting from insufficiently vaporized fuel. In addition, the fuel-spray flow, which may be directed through the ridge line 11 to the exhaust valve 17 and adhered to the cylinder-bore wall or to the combustion-chamber wall, is effectively suppressed by another small longitudinal intake-air vortex flow 26, which vortex flow is produced between the up-sloped flat-surface portion 13 and the cylinder-head inner wall facing the flat-surface portion 13 essentially at TDC. This suppresses lubricating oil from being diluted with fuel. As appreciated from the above, the improved engine structure can insure a stable combustion even when the fuel injection is made on the compression stroke.

Figure 17A:
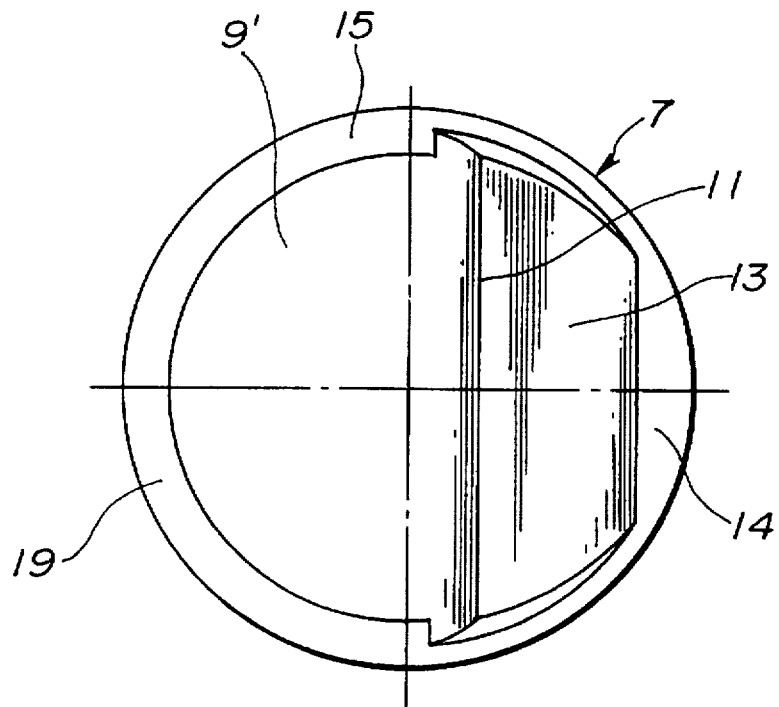
FIGS. 17A and 17B are a plan view and a partial cross-sectional view, showing a modification of the shape of a piston head of a direct-injection type engine.
Figure 17B:
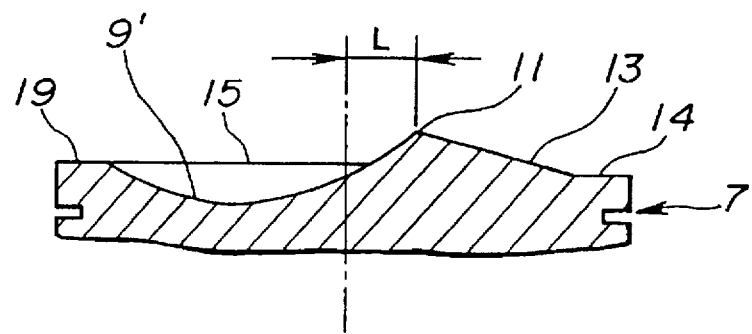

Referring now to FIGS. 17A and 17B, there is shown a modification of the piston crown. The previously-noted improved piston structure shown in FIGS. 7A and 7B has the recessed portion 9 which is formed into a substantially cylindrical hollow shape, and the up-sloped flat-surface portion 13. On the other hand, the recessed portion of the piston crown of the modification is comprised of a downwardly-curved concave surface portion 9', so as to cause a more smooth atomization and vaporization of the fuel spray introduced into the combustion chamber. The concave surface portion is comprised of a cylindrical surface having a predetermined curvature and extending in a direction (equivalent to the axial direction of the piston pin) perpendicular to the direction extending from the intake-valve port side to the exhaust-valve port side. The depth of the concave surface portion 9' is so designed to be equal to that of the recessed portion 9 with the flat bottom. Owing to the difference of shape between the concave surface 9' and the recessed portion 9, the volumetric capacity of the concave surface portion 9' shown in FIGS. 17A and 17B is less than that of the recessed portion 9 shown in FIGS. 7A and 7B, and thus the piston structure of FIGS. 17A and 17B is more advantageous in compression ratio. As indicated by the hatched regions in FIGS. 13 and 16, in case of the piston structure of FIGS. 17A and 17B, the compression ratio can be set at a higher value in comparison with the piston structure of FIGS. 7A and 7B, while keeping the previously-mentioned MPI level of the lubricating-oil dilution-gasoline amount and the allowable level of the combustion stability. Additionally, the piston structure having the downwardly-curved concave surface portion 9' is superior in machining and production costs.

Figure 18:
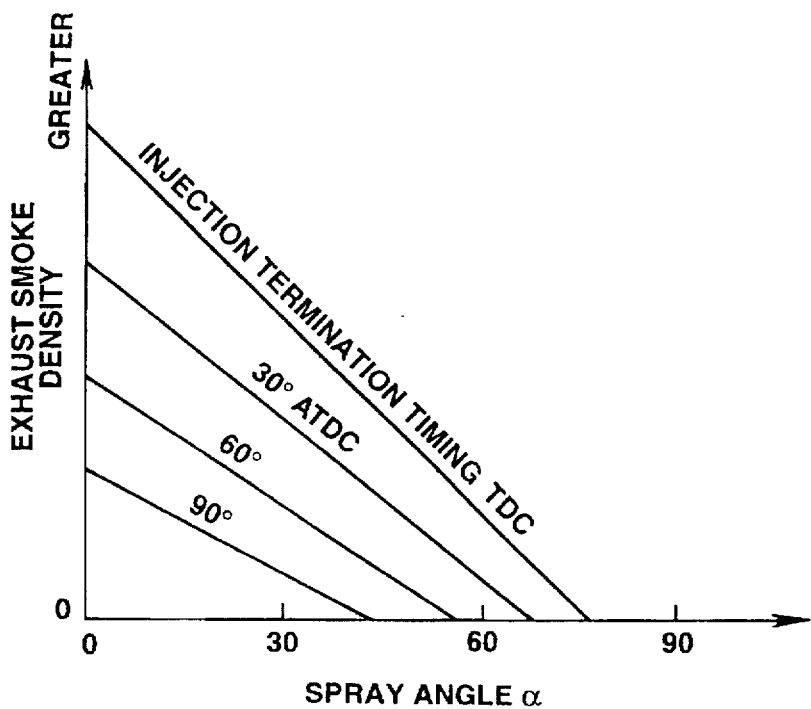
FIG. 18 is a graph illustrating the relationship between the fuel-spray angle ($\alpha$) and the exhaust smoke density or concentration at a plurality of fuel-injection termination timings.
Figure 19:
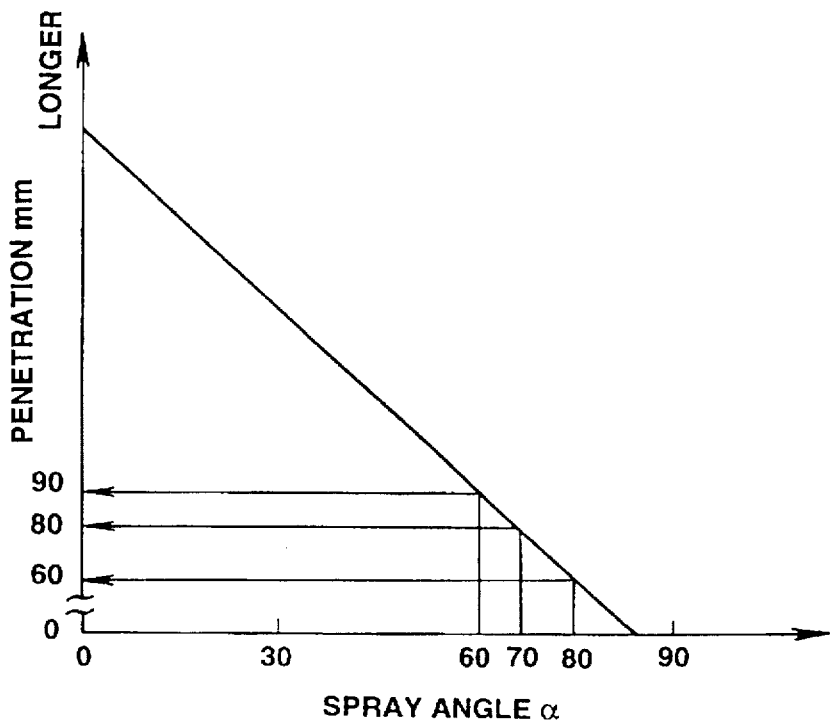
FIG. 19 is a graph illustrating the relationship between the fuel-spray angle ($\alpha$) and the spray penetration.
Figure 21A:
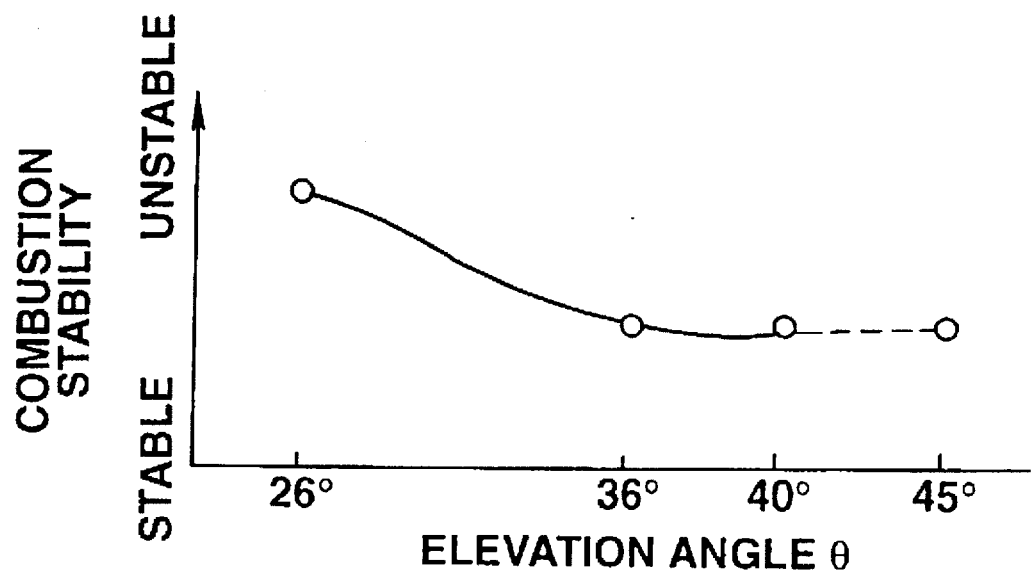
FIG. 21A is a graph illustrating an elevation-angle ($\theta$) versus combustion stability.
Figure 21B:
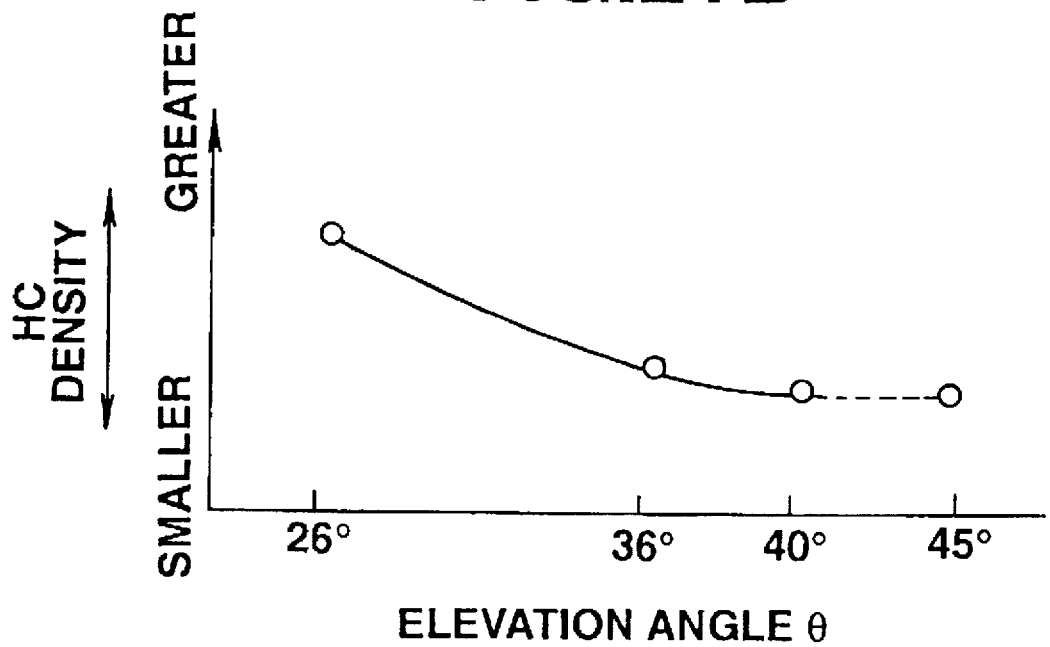
FIG. 21B is a graph illustrating an elevation-angle ($\theta$) versus HC density.
Figure 22:
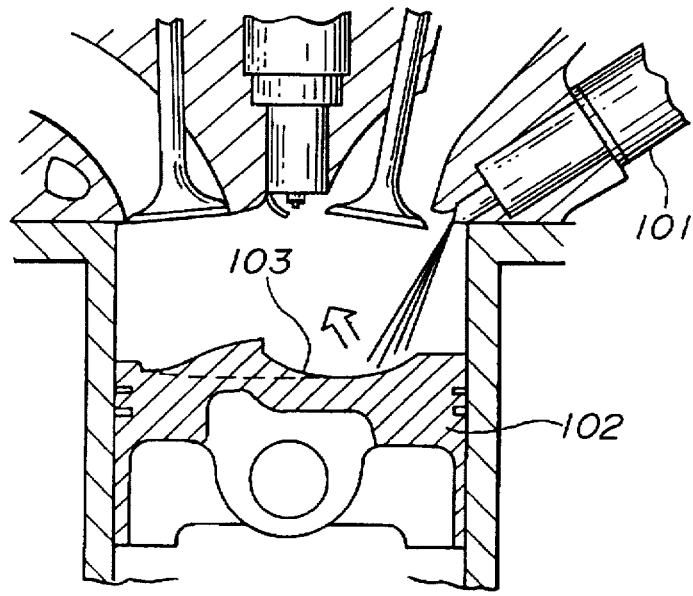
FIG. 22 is a schematic longitudinal cross-sectional view illustrating a prior art cylinder direct-injection type internal combustion engine.
Figure 23:
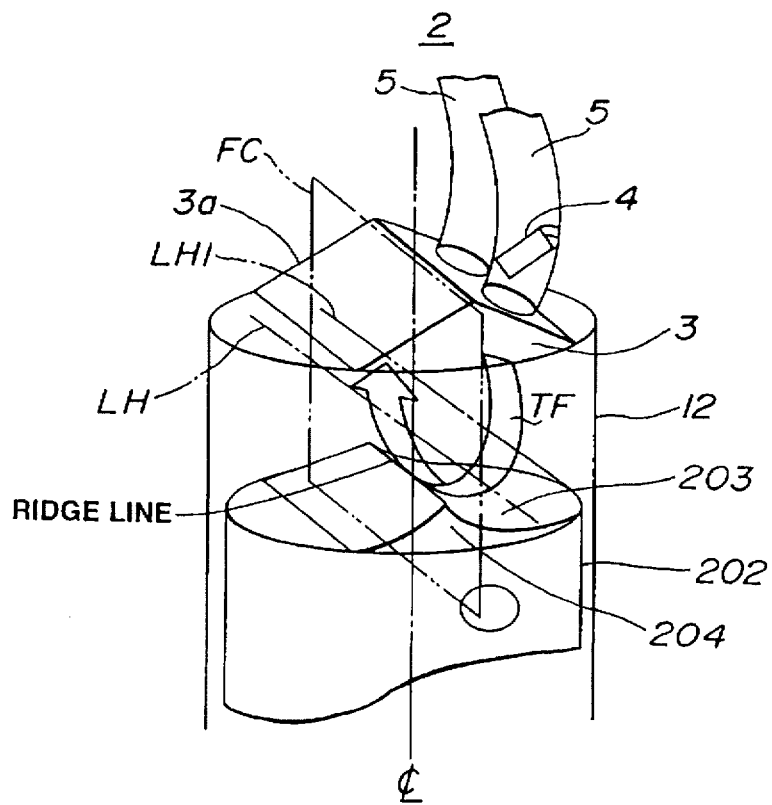
FIG. 23 is a schematic perspective view illustrating another prior art cylinder direct-injection type internal combustion engine.
Figure 24:
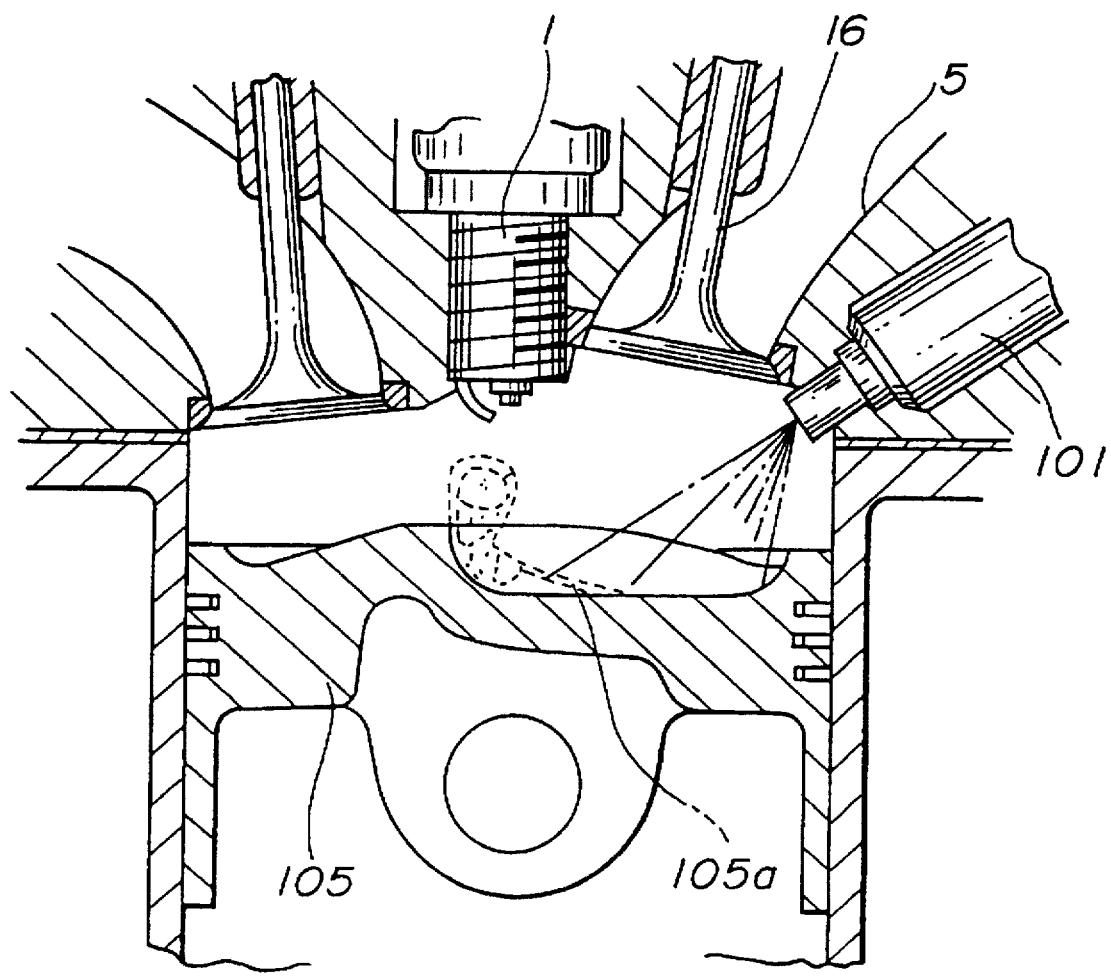
FIG. 24 is a schematic longitudinal cross-sectional view illustrating another prior art cylinder direct-injection type internal combustion engine.

Details of various characteristics (namely an exhaust smoke density, a spray penetration, and a lubrication-oil dilution-gasoline-fuel amount) with respect to spray angles, are hereinafter discussed by reference to FIGS. 18 through 20. Furthermore discussed in reference to FIGS. 21A and 21B are test results representative of two characteristics (namely a combustion stability and an unburnt hydrocarbons (HC) density) with respect to elevation angles θ. Various test results shown in FIGS. 18, 19, 20, 21A and 21B are experimentally assured by the inventors of the present invention. From these test results, it is preferable to determine or set a direction of installation of the injection valve 4 so that an inequality $\alpha/2 \leq \theta \leq 90° - \alpha/2$ is satisfied in the mutual relationship between the spray angle α and the elevation angle θ. As regards spray angles α, it is preferable to set the spray angle α within an angle range of 70°±20°, i.e., $50° \leq \alpha \leq 90°$ (more preferably 65°±5°, i.e., $60° \leq \alpha \leq 70°$). By way of the mutual relationship between the two angles α and θ and the above-mentioned preferable spray-angle range, the uppermost and lowermost lines 8a and 8b of the fuel spray are limited within an optimal range which is suitable to avoid direct collision between the combustion-chamber wall 3a and the fuel spray, and between the respective cylinder inner walls 12a and 12b and the fuel spray. Also there is less possibility of direct collision between the piston crown of the piston 7 and the fuel spray except near the top dead center (TDC), even when the fuel-injection timing is set on the intake stroke. Since the piston crown is closer to the spray hole 4a of the injection valve 4 near at TDC on the intake stroke, the fuel spray tends to collide with the piston crown even with the spray penetration kept shorter. However, if the spray angle α is set at a comparatively great angle, there is a tendency for exhaust smoke density to be greatly reduced even in the presence of collision between the fuel spray and the piston crown, because of an extremely high spray distribution under a considerably high fuel-injection pressure which pressure is usually set at a high pressure level, for example 5 MPa±1 MPa and because of less exposed surface areas of the cylinder inner walls 12a and 12b. In FIG. 18, ATDC means "after TDC". FIG. 18 shows the relationship between the spray angle α and the exhaust smoke density when the fuel-injection termination timing is just at TDC (0°), and at the crank angles of 30°, 60° and 90° after TDC. As appreciated from the correlation between the spray angle and the smoke density as shown in FIG. 18, the greater the spray angle α, the smaller the smoke density. Four intersection points between the correlative lines (just TDC, 30°ATDC, 60°ATDC, 90°ATDC) and the axis of abscissa (X-axis) correspond to required spray angles, at which angles the smoke density is zero, at the respective injection termination timings. From the test results, the required spray angle range is within a total-angle range of 50° to 90° (preferably 60° to 70°). In case that the spraying action is an axial-symmetry spray, the required spray angel range corresponds to an axial-symmetry spray angle ±30° to ±35°. For example, in case that the spray angle α is 70° in total angle, preferably the elevation angle (θ) range can be set at an angle range of $35° \leq \theta \leq 55°$ in accordance with the previously-noted inequality $\alpha/2 \leq \theta \leq 90° - \alpha/2$. In this case, the lowermost line 8b is set at an angle-of-depression ranging 70° to 90°, with respect to the bottom face of the cylinder head, which bottom face extends horizontally in ease of an in-line engine.

For instance, in case of θ=55°, the angle-of-depression of the lowermost line 8b is set essentially at 90°, that is, the lowermost line 8b vertically extends essentially parallel to the cylinder inner wall 12a. Therefore, there is a greatly increased tendency for the cylinder inner wall to get wet through a part of he fuel spray near the lowermost line 8b, if the spray angle α is set a greater value than 70°. On the other hand, the angle-of-depression of the uppermost line 8a is set within an angle range of 0° to 20° in case of α=70° and 35°≦θ≦55°. This prevents the spark plug 1 from getting wet through a part of the fuel spray near the uppermost line 8a and also prevents undesired adhesion of the fuel to the combustion-chamber wall. The wide spray-angle requirement, i.e., a comparatively wide spray angle such as 70°, is effective to reduce spray penetration. The shorter the spray penetration, the shorter the fuel-spray travel. FIG. 19 shows the relationship between the spray angle α and the spray penetration (the fuel-spray travel). As appreciated from the characteristic shown in FIG. 19, the greater the spray angle α, the smaller the spray penetration, that is, the spray penetration is in inverse-proportion to the spray angle α. Owing to the spray angle kept at a great angle, if the spray penetration is less than the cylinder bore, the direct collision between the fuel spray and the cylinder inner wall may be avoided. In the case that the required spray angle range is set within an angle range of 60° to 70° in total angle, the spray penetration (or the fuel-spray travel) becomes a distance ranging 90 mm to 80 mm. Although the cylinder bore is different depending upon sizes and shapes of engines, in general, the collision between the fuel spray and the cylinder inner wall may be avoided with the spray penetration of 80 to 90 mm. FIG. 20 shows the relationship between the spray angle α and the lubricating-oil dilution-fuel amount. As can be appreciated from the correlation shown in FIG. 20, the greater the spray angle α, the smaller the amount of fuel (gasoline) mixed with or diluted with lubricating oil. Also, the required spray angle, which is equivalent to the previously-explained MPI level, is approximately 70°. The spray-angle range of 60° to 70° can satisfy two requirements, namely suppression of formation of exhaust smoke and avoidance of collision between the fuel spray and the cylinder inner wall. FIG. 21A shows the relationship between the elevation angle θ and the combustion stability, whereas FIGS. 21B shows the relationship between the elevation angle θ and the HC density. In the respective graphs illustrated in FIGS. 21A and 21B, the solid line shows actual test data, while the broken line shows a curve estimated from the actual test data. As shown in FIGS. 21A and 21B, homogeneous combustion was obtained substantially within an elevation-angle range of 35°±10°, during the injection period on the intake stroke. The previously-noted proper determination of the spray angle α and the elevation angle θ can eliminate the problems inherent in the direct-injection type spark-ignition gasoline-fuel engine, namely insufficient lubrication resulting from degraded lubricating oil involving gasoline fuel, and a great exhaust smoke density. Additionally, the mutual relationship between the spray angle α and the elevation angle θ, defined by the inequality α/2≦θ≦90°−α/2, is very important, since the uppermost line 8a is kept at a lower level than the electrodes of the spark plug and thereby preventing diffusion combustion which may occur due to a film of fuel adhered to the electrodes of the plug by collision. As is generally known, the diffusion combustion could cause soot on the plug and consequently result in engine misfiring. For the reasons set out above, it is preferable to determine the spray angle α within a predetermined wide angle range of 50°≦α≦90°, more preferably 60°≦α≦70°, and additionally in combination with the above-mentioned predetermined wide spray-angle range it is indispensable to determine the elevation angle θ in a manner so as to satisfy the inequality α/2≦θ≦90°−α/2. Such an optimum combination of the two angles α and θ can greatly reduce the exhaust smoke density and the lubricating-oil dilution-fuel amount, as seen in FIGS. 15 and 13. As may be appreciated from the test results of FIG. 15, the smoke density is approximately zero within a crank angle range of 0° (just at TDC on the intake stroke) to 120° (after TDC on the intake stroke). The previously-described optimum combination or optimum designing of the spray angle α and the elevation angle θ may be applicable to a typical cylinder direct-injection type spark-ignition internal combustion engine with a flat-head piston, as well as the improved direct-injection type spark-ignition internal combustion engine with a relatively complicated piston crown structure having a recessed portion (9; 9'), a raised flat-surface portion (10; 13) and a ridge line (11) defined as the intersecting line between the recessed portion and the raised flat-surface portion. In order to ensure both a superior combustion performance and a high emission control performance, it is preferable to combine the previously-noted optimum designing of the spray angle α and the elevation angle θ with the piston crown structure having superior geometry and shapes as shown in FIGS. 7A and 17A.

Moreover, as previously described, when the injection valve 4 is installed on the cylinder head in such a manner as to be located near and below the intake-valve port, the injection valves can be easily mounted on the cylinder head without changing a basic construction of a usual four-valve, gasoline-fuel, spark-ignition internal combustion engine with two intake valves and two exhaust valved per one cylinder.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A direct-injection type spark-ignition internal combustion engine, comprising:

a cylinder head having an intake-valve port and an exhaust-valve port;

a cylinder block having a cylinder;

a piston moveable up and down within said cylinder;

a spark plug disposed essentially in a center of a combustion chamber defined by a piston crown of said piston and said cylinder head; and a fuel-injection valve mounted on said cylinder head near and below said intake-valve port so that a spray hole of said injection valve opens through a combustion-chamber wall into said combustion chamber, and so that an uppermost line of fuel spray injected through said spray hole is set at a lower level than an electrode end of said spark plug and a lowermost line of said fuel spray is in spaced relationship with a cylinder inner wall close to said spray hole;

wherein said piston crown is formed with a recessed portion and a raised flat-surface portion, said recessed portion facing said inlet-valve port essentially at a top dead center and receiving almost all of said fuel spray at a fuel-injection period near the top dead center, and said raised flat-surface portion facing said exhaust-valve port essentially at the top dead center and gradually up-sloped in a direction extending from said exhaust-valve port to said intake-valve port, wherein a ridge line is defined as an intersecting line between a sloped surface of said recessed portion and said raised flat-surface portion, and said ridge line is offset from a center axis of said cylinder by a predetermined distance toward a side of said exhaust-valve port and raised by a predetermined height toward said cylinder head, and wherein a spray angle between said uppermost and lowermost lines is set within a predetermined angle range of 70°±20°.

2. A direct-injection type spark-ignition internal combustion engine, comprising:

a cylinder head having an intake-valve port and an exhaust-valve port;

a cylinder block having a cylinder;

a piston moveable up and down within said cylinder;

a spark plug disposed essentially in a center of a combustion chamber defined by a piston crown of said piston and said cylinder head; and a fuel-injection valve mounted on said cylinder head near and below said intake-valve port so that a spray hole of said injection valve opens through a combustion-chamber wall into said combustion chamber, and so that an uppermost line of fuel spray injected through said spray hole is set at a lower level than an electrode end of said spark plug and a lowermost line of said fuel spray is in spaced relationship with a cylinder inner wall close to said spray hole;

wherein said piston crown is formed with a recessed portion and a raised flat-surface portion, said recessed portion facing said inlet-valve port essentially at a top dead center and receiving almost all of said fuel spray at a fuel-injection period near the top dead center, and said raised flat-surface portion facing said exhaust-valve port essentially at the top dead center and gradually up-sloped in a direction extending from said exhaust-valve port to said intake-valve port, wherein a ridge line is defined as an intersecting line between said recessed portion and said raised flat-surface portion, and said ridge line is offset from a center axis of said cylinder by a predetermined distance toward a side of said exhaust-valve port, and said ridge line is formed on said piston crown so that an outermost curved line of a collision area of the fuel spray on said piston crown intersects said ridge line during at least a fuel-injection period from initiation of fuel injection essentially to a crank angle of 120° after the top dead center, and wherein a spray angle between said uppermost and lowermost lines is set within a predetermined angle range of 70°±20°.

3. A direct-injection type spark-ignition internal combustion engine, comprising:

a cylinder head having an intake-valve port and an exhaust-valve port;

a cylinder block having a cylinder;

a piston moveable up and down within said cylinder;

a spark plug disposed essentially in a center of a combustion chamber defined by a piston crown of said piston and said cylinder head; and a fuel-injection valve mounted on said cylinder head near and below said intake-valve port so that a spray hole of said injection valve opens through a combustion-chamber wall into said combustion chamber, and so that an uppermost line of fuel spray injected through said spray hole is set at a lower level than an electrode end of said spark plug and a lowermost line of said fuel spray is in spaced relationship with a cylinder inner wall close to said spray hole;

wherein said piston crown is formed with at least a raised flat-surface portion facing said exhaust-valve port essentially at a top dead center and gradually up-sloped in a direction extending from said exhaust-valve port to said intake-valve port, for defining a ridge line by a maximum raised edge of said raised flat-surface portion, wherein said ridge line is offset from a center axis of said cylinder by a predetermined distance toward a side of said exhaust-valve port, and said ridge line is formed on said piston crown so that an outermost curved line of a collision area of the fuel spray on said piston crown intersects said ridge line during at least a fuel-injection period from initiation of fuel injection essentially to a crank angle of 120° after the top dead center, and wherein a spray angle between said uppermost and lowermost lines is set within a predetermined angle range of 70°±20°.

4. A direct-injection type spark-ignition internal combustion engine as set forth in claim 2, wherein a termination timing of fuel injection is set within a crank-angle range of 90° to 120° after the top dead center.

5. A direct-injection type spark-ignition internal combustion engine as set forth in claim 4, wherein an angle-of-elevation, which is defined as an angle between a bottom face of said cylinder head and a center axis of said fuel-injection valve, is set within an angle range of 35°±10°.

6. A direct-injection type spark-ignition internal combustion engine comprising:

an intake-valve port formed in a cylinder head;

an exhaust-valve port formed in said cylinder head;

a cylinder block having a cylinder;

a piston moveable up and down within said cylinder;

a spark plug disposed between said intake-valve port and said exhaust-valve port and essentially in a center of a combustion chamber defined by a piston crown of said piston and said cylinder head; and a fuel-injection valve mounted on said cylinder head near and below said intake-valve port so that a spray hole of said injection valve opens through a combustion-chamber wall into said combustion chamber;

wherein said intake-valve port is directed toward a cylinder inner wall closer to said exhaust-valve port for producing a vortex flow rotating from said cylinder inner wall toward said piston crown by colliding intake air coming from said intake-valve port with said cylinder inner wall, wherein said piston crown is formed with a recessed portion and a raised flat-surface portion, said recessed portion facing said inlet-valve port essentially at a top dead center, and said raised flat-surface portion facing said exhaust-valve port essentially at the top dead center and gradually up-sloped in a direction extending from said exhaust-valve port to said intake-valve port, and wherein a ridge line is defined as an intersecting line between said recessed portion and said raised flat-surface portion and said ridge line is offset from a center axis of said cylinder by a predetermined distance toward a side of said exhaust-valve port.

7. A direct-injection type spark-ignition internal combustion engine as set forth in claim 6, wherein said ridge line is up-sloped straight along a ceiling wall of a pent-roof shaped combustion chamber defined on a bottom of said cylinder head.

8. A direct-injection type spark-ignition internal combustion engine as set forth in claim 7, wherein said piston crown has an outer peripheral flat-surface portion formed at a higher level than said recessed portion and being cooperative with said combustion-chamber wall for defining an aperture on said piston crown at the top dead center to fling fuel spray up and to suppress adhesion of fuel to the cylinder inner wall.

9. A direct-injection type spark-ignition internal combustion engine as set forth in claim 7, wherein a maximum edge of said ridge line is formed at a higher level than said spray hole at the top dead center.

10. A direct-injection type spark-ignition internal combustion engine as set forth in claim 9, wherein the maximum edge of said ridge line is formed at a higher level than said outer peripheral flat-surface portion.

11. A direct-injection type spark-ignition internal combustion engine as set forth in claim 6, wherein said recessed portion is formed into a substantially cylindrical hollow shape.

12. A direct-injection type spark-ignition internal combustion engine as set forth in claim 6, wherein said recessed portion comprises a downwardly-curved concave surface portion being a cylindrical surface having a predetermined curvature and extending in a direction of a piston pin of said piston.

13. A direct-injection type spark-ignition internal combustion engine comprising:

an intake-valve port formed in a cylinder head;

an exhaust-valve port formed in said cylinder head;

a cylinder block having a cylinder;

a piston moveable up and down within said cylinder;

a spark plug disposed between said intake-valve port and said exhaust-valve port and essentially in a center of a combustion chamber defined by a piston crown of said piston and said cylinder head; and a fuel-injection valve mounted on said cylinder head near and below said intake-valve port so that a spray hole of said injection valve opens through a combustion-chamber wall into said combustion chamber;

wherein said piston crown is formed with a recessed portion and a raised flat-surface portion, said recessed portion facing said inlet-valve port essentially at a top dead center, and said raised flat-surface portion facing said exhaust-valve port essentially at the top dead center and gradually up-sloped in a direction extending from said exhaust-valve port to said intake-valve port, wherein a ridge line is defined as an intersecting line between said recessed portion and said raised flat-surface portion and said ridge line is offset from a center axis of said cylinder by a predetermined distance toward a side of said exhaust-valve port, and wherein said intake-valve port is directed toward a cylinder inner wall closer to said exhaust-valve port for producing a first vortex flow (22) rotating from said cylinder inner wall toward said piston crown by colliding intake air coming from said intake-valve port with said cylinder inner wall and a second vortex flow (23) rotating from said ridge line toward a cylinder inner wall closer to said intake-valve port, on an intake stroke.

14. A direct-injection type spark-ignition internal combustion engine comprising:

a cylinder head having an intake-valve port and an exhaust-valve port;

a cylinder block having a cylinder;

a piston moveable up and down within said cylinder;

a spark plug disposed between said intake-valve port and said exhaust-valve port and essentially in a center of a combustion chamber defined by a piston crown of said piston and said cylinder head; and a fuel-injection valve mounted on said cylinder head near and below said intake-valve port so that a spray hole of said injection valve opens through a combustion-chamber wall into said combustion chamber, and so that an uppermost line of fuel spray injected through said spray hole is set at a lower level than an electrode end of said spark plug and a lowermost line of said fuel spray is in spaced relationship with a cylinder inner wall close to said spray hole;

wherein a spray angle between said uppermost and lowermost lines is set within a predetermined angle range of 70°±20°, and wherein an angle-of-elevation, which is defined as an angle between a bottom face of said cylinder head and a center axis of said fuel-injection valve, is defined by an inequality $\alpha/2 \leq \theta \leq 90° - \alpha/2$, where $\alpha$ denotes said spray angle and $\theta$ denotes said angle-of-elevation.

15. A direct-injection type spark-ignition internal combustion engine comprising:

a cylinder head having an intake-valve port and an exhaust-valve port;

a cylinder block having a cylinder;

a piston moveable up and down within said cylinder;

a spark plug disposed between said intake-valve port and said exhaust-valve port and essentially in a center of a combustion chamber defined by a piston crown of said piston and said cylinder head; and a fuel-injection valve mounted on said cylinder head near and below said intake-valve port so that a spray hole of said injection valve opens through a combustion-chamber wall into said combustion chamber, and so that an uppermost line of fuel spray injected through said spray hole is set at a lower level than an electrode end of said spark plug and a lowermost line of said fuel spray is in spaced relationship with a cylinder inner wall close to said spray hole;

wherein a spray angle between said uppermost and lowermost lines is set within a predetermined angle range of 65°±5°, and wherein an angle-of-elevation, which is defined as an angle between a bottom face of said cylinder head and a center axis of said fuel-injection valve, is defined by an inequality $\alpha/2 \leq \theta \leq 90° - \alpha/2$, where $\alpha$ denotes said spray angle and $\theta$ denotes said angle-of-elevation.

* * * * *